US007016744B2

(12) United States Patent
Howard et al.

(10) Patent No.: US 7,016,744 B2
(45) Date of Patent: Mar. 21, 2006

(54) MAN-MACHINE INTERFACE

(75) Inventors: Mark A. Howard, Suffolk (GB); Richard A. Doyle, Middlesex (GB); Alice Richard, Angus (GB)

(73) Assignee: Scientific Generics Limited, Cambridge (GB)

( * ) Notice: Subject to any disclaimer, the term of this patent is extended or adjusted under 35 U.S.C. 154(b) by 498 days.

(21) Appl. No.: 10/165,205

(22) Filed: Jun. 7, 2002

(65) Prior Publication Data

US 2003/0229404 A1 Dec. 11, 2003

Related U.S. Application Data

(63) Continuation of application No. PCT/GB00/04749, filed on Dec. 8, 2000.

(30) Foreign Application Priority Data

| | | |
|---|---|---|
| Dec. 10, 1999 | (GB) | 9929386 |
| Mar. 1, 2000 | (GB) | 0004987 |
| Mar. 14, 2000 | (GB) | 0006130 |
| Apr. 13, 2000 | (GB) | 0009142 |
| Jun. 16, 2000 | (GB) | 0014889 |
| Jul. 20, 2000 | (GB) | 0017888 |
| Aug. 9, 2000 | (GB) | 0019624 |
| Sep. 28, 2000 | (GB) | 0023806 |

(51) Int. Cl.
*G05B 15/00* (2006.01)

(52) U.S. Cl. ........................ 700/83; 700/253; 700/258; 700/259; 700/264; 307/104; 307/117; 307/119; 219/625; 219/620

(58) Field of Classification Search .................. 700/83, 700/253, 258, 259, 264; 307/104, 117, 119; 219/625, 620, 457.1
See application file for complete search history.

(56) References Cited

U.S. PATENT DOCUMENTS

| | | | | |
|---|---|---|---|---|
| 3,772,587 | A | 11/1973 | Farrand et al. | 323/46 |
| 3,852,558 | A | 12/1974 | McCleerey et al. | 219/10.49 |
| 3,926,225 | A | 12/1975 | Palencher et al. | 139/125 |
| 4,223,593 | A | 9/1980 | Kitayama et al. | 91/477 |
| 4,504,832 | A | 3/1985 | Conte | 340/870.37 |
| 4,617,441 | A | 10/1986 | Koide et al. | 219/10.77 |
| 4,737,698 | A | 4/1988 | McMullin et al. | 318/653 |
| 4,816,647 | A | 3/1989 | Payne | 219/464 |
| 4,831,253 | A | 5/1989 | Omura et al. | 250/229 |
| 4,983,812 | A | 1/1991 | Worrall et al. | 219/451 |
| 4,985,691 | A | 1/1991 | Pulyer et al. | 336/130 |
| 5,023,408 | A | 6/1991 | Murakami et al. | 178/19 |
| 5,117,355 | A | 5/1992 | McCarthy | 364/405 |
| 5,214,427 | A | 5/1993 | Yano | 341/20 |
| 5,347,123 | A | 9/1994 | Jackson et al. | 250/229 |
| 5,523,730 | A | 6/1996 | Van Zeeland | 335/204 |
| 5,796,250 | A | 8/1998 | Dames | 324/207.22 |

(Continued)

FOREIGN PATENT DOCUMENTS

DE 2646047 6/1978

(Continued)

*Primary Examiner*—Anthony Knight
*Assistant Examiner*—Thomas Pham
(74) *Attorney, Agent, or Firm*—Schwegman, Lundberg, Woessner & Kluth, P.A.

(57) ABSTRACT

A man-machine interface is provided for a domestic appliance in which remotely sensed buttons, slider bars, marker pucks and a knob are used. The sensing coils for remotely sensing the positions of the buttons, slider bars, marker pucks and the knob are formed on a printed circuit board which is located behind a sealed surface such that there is no risk of contaminants accessing the printed circuit board.

61 Claims, 18 Drawing Sheets

U.S. PATENT DOCUMENTS

| | | | | |
|---|---|---|---|---|
| 5,815,091 | A | 9/1998 | Dames et al. | 340/870.34 |
| 5,920,131 | A | 7/1999 | Platt et al. | 307/104 |
| 5,933,085 | A * | 8/1999 | Holcomb et al. | 340/5.66 |
| 5,973,494 | A | 10/1999 | Masreliez et al. | 324/207.24 |
| 5,986,464 | A * | 11/1999 | Luck et al. | 326/36 |
| 6,124,708 | A | 9/2000 | Dames | 324/207.12 |
| 6,131,288 | A * | 10/2000 | Westerhof et al. | 30/41 |
| 6,164,531 | A * | 12/2000 | Harris et al. | 235/380 |
| 6,175,232 | B1 | 1/2001 | DeCoulon et al. | 324/207.12 |
| 6,239,571 | B1 | 5/2001 | Shimahara | 318/605 |
| 6,304,014 | B1 | 10/2001 | England et al. | 310/68 B |
| 6,498,326 | B1 | 12/2002 | Knappe | 219/625 |
| 6,552,650 | B1 * | 4/2003 | Gokcebay et al. | 340/5.65 |

FOREIGN PATENT DOCUMENTS

| | | |
|---|---|---|
| DE | 3345822 | 6/1985 |
| DE | 3918640 | 12/1990 |
| DE | 4432399 | 3/1996 |
| EP | 0016511 | 10/1980 |
| EP | 0400453 | 12/1990 |
| EP | 0497191 | 8/1992 |
| EP | 0 552 001 A1 | 7/1993 |
| EP | 0600780 | 6/1994 |
| EP | 0 871 012 A1 | 10/1998 |
| GB | 1511676 | 5/1978 |
| GB | 2 273 778 A | 6/1994 |
| GB | 2 314 415 A | 12/1997 |
| GB | 2 320 096 A | 6/1998 |
| JP | 64040916 | 2/1989 |
| JP | 05028879 | 2/1993 |
| WO | WO-98/00921 | 1/1998 |
| WO | WO-98/24527 | 6/1998 |
| WO | WO-98/54547 | 12/1998 |
| WO | WO-98/58237 | 12/1998 |
| WO | WO-99/34171 | 7/1999 |
| WO | WO-99/61868 | 12/1999 |
| WO | WO-00/33244 | 6/2000 |
| WO | WO-00/77480 | 12/2000 |
| WO | WO-01/29759 | 4/2001 |

* cited by examiner

*FIG. 9*

| PARAMETER | POSSIBLE VALUES | FREQUENCY AND COLOUR FOR RELEVANT PUCKS |
|---|---|---|
| LEFT PANEL IDENTIFIER | 0,1,2,3 | xy TABLET A<br>$f_1, f_2, f_3$<br>$y \leqslant 2$ |
| KNOB POSITION | 0,1,2,3,4 | N/A |
| OPERATOR IDENTIFIER | 0,1,2,..........,10 | xy TABLET A<br>$f_{16}, f_{17}, f_{18}, f_{19}, f_{20}$<br>$x \geqslant 6, y \geqslant 6$ |
| RIGHT PANEL IDENTIFIER | 0,1,2,3 | xy TABLET C<br>$f_1, f_2, f_3$<br>$x \leqslant 5, y \leqslant 2$ |
| x,y POSITIONS OF MARKER PUCKS | $x_1$=0.0-10.0<br>$y_1$=0.0-10.0<br>$x_2$=0.0-10.0<br>⋮ | xy TABLET B<br>$f_1 - f_{12}$ |
| RIGHT PANEL ADDITIONAL SWITCHES | SWITCH ID 1-6<br>SWITCH POSITION 1-6 OR 0,1 | xy TABLET C<br>$f_4 - f_9$<br>$x \leqslant 5, y \geqslant 3$ |
| FASCIA IDENTIFIER | 0-100 | xy TABLET C<br>$f_{16} - f_{20}$<br>$x \geqslant 6, y \leqslant 2$ |
| FASCIA SWITCHES | SWITCH ID 1,2<br>SWITCH POSITION 0,1 | xy TABLET C<br>$f_{10}, f_{11}$<br>$x \geqslant 6, y \geqslant 3$ |

MAN-MACHINE INTERFACE

CROSS REFERENCE TO RELATED APPLICATIONS

This patent application claims the benefit of priority under 35 U.S.C. Section 119, to the following applications:

Application Number Filed
9929386.2 Dec. 10, 1999
0004987.4 Mar. 1, 2000
0006130.9 Mar. 14, 2000
0009142.1 Apr. 13, 2000
0014889.0 Jun. 16, 2000
0017888.9 Jul. 20, 2000
0019624.6 Aug. 9, 2000
0023806.3 Sep. 28, 2000

This patent application is a continuation of and claims the benefit of priority, under 35 U.S.C. Section 120 or 365(c), to application number: PCT/GB00/04749, filed on Dec. 8, 2000.

FIELD OF THE INVENTION

The present invention relates to a man-machine interface, and in particular to a man-machine interface for domestic appliances requiring an inexpensive yet reasonably sophisticated interface.

BACKGROUND OF THE INVENTION

White goods appliances typically include a low cost interface including one or more mechanical buttons or switches which physically make or break a circuit and one or more rotatable knobs having, typically, a finite number of discrete orientations. Such knobs typically control a potentiometer such that each different orientation causes the potentiometer to present a corresponding resistance to a detector circuit which thereby detects the state of the knob, converts this to a digital value and communicates this to a controlling microprocessor which takes the appropriate action. Alternatively, the knob could be connected to an energy regulator including a bi-metallic strip which bends as it heats or cools to make or break on electrical contact, especially in the case of an electric cooker.

There are a number of problems with such an interface. A physical shaft connects the potentiometer or energy regulator to the outside knob. It is very difficult to seal around such a shaft and so there is usually a risk of contaminants such as water, soap, dirt, etc. gaining access to, and therefore possibly damaging, the potentiometer and the associated electronics. Also, in the case of kitchen equipment, there may be health risks caused by the entrapment of fat or food particles around the shaft. Furthermore, if the knob is to be mounted onto the side of a box in which the potentiometer or energy regulator is mounted, a hole must be preformed (e.g. by drilling) in the correct location on the side of the box for receiving the potentiometer shaft. Similarly, with mechanical push buttons, suitable holes must be preformed through the side of the box where the push buttons are to be mounted. This means that if a manufacturer wishes to produce a similar appliance but with a different arrangement of switches and knobs etc, a new box with different preformed holes must be manufactured, leading to increased manufacturing costs.

SUMMARY OF THE INVENTION

The present invention seeks to provide an alternative man-machine interface for such domestic appliances.

According to a first aspect of the present invention, there is provided a man-machine interface for an appliance having multiple user-settable control options, the user interface comprising sensing means for remotely sensing one or more target elements to obtain positional information thereabout, and user actuable control elements including one or more target elements, wherein the appliance is operable to select a control option in dependence on the sensed position and/or orientation of the user actuable control elements.

Such a man-machine interface permits the electronics or electrical control equipment of the appliance (or at least of the man-machine interface) to be located within an easily sealed box such that contaminants to which one or more of the user-actuable control elements are exposed cannot leak into the sealed box. Furthermore, since no holes need to be preformed to receive the user-actuable control elements, different arrangements of the user-actuable control elements may be affixed to the same sealed box. This permits a single model of a particular type of appliance to employ a large number of different man-machine interfaces each of which may be tailored to provide an intuitive interface for the particular function of the appliance to be controlled via that particular interface. Furthermore, different models of a similar appliance may be manufactured using the same sealed box, the different models being distinguished by differences in the man-machine interfaces.

The man-machine interface may include an inductive sensing arrangement wherein the sensing means includes one or more sensing coils and the target elements include one or more inductive target elements which include a magnetic (or electro-magnetic) field modifying element such as a resonant circuit. An advantage of using an inductive sensing arrangement is that the inductive target elements such as resonant circuits may be manufactured very cheaply. A further advantage is that the same processing circuitry which is used to process signals generated in the inductive sensing coils associated with the man-machine interface may also be used to process similar signals generated by further inductive sensing coils used, together with associated further target elements, to detect values of one or more parameters describing the internal functioning or state of the appliance. For example, the same processing circuitry may be used to monitor the speed of rotation of a motor, the amplitude and frequency of vibration of a washing machine drum, or the level of water within the drum of a washing machine, in addition to monitoring user actuable elements of a man-machine interface. Furthermore, the inductive sensing means can also be used to provide a secure electronic lock or electronic user identification system by recognising a user identification puck comprising a plurality of target elements in a specified positional relationship to one another.

Alternatively, or in addition, the sensing means may include one or more simple contactless magnetic switches such as reed switches which are arranged to respond to the position of one or more user actuable elements which include a magnetic field altering element such as, for example, a bar magnet. Such an arrangement has the advantage of being inexpensive and robust. However, alternative contactless magnetic devices could be used such as those which rely on the Hall effect or which employ Giant MagnetoResistance (GMR).

Preferably, the user-actuable control elements are mounted so as to provide tactile sensory feedback to the user. For example, a knob having a plurality of protrusions or indents may be mounted onto a surface having corresponding indents or protrusions such that the user feels a series of clicks as the knob is rotated. Such an arrangement will increase user confidence that the interface is operating correctly. One advantage of such an arrangement is that the feel and sound of the clicks can be finely tuned so as to give the user optimal feedback (and quality perception) independently of the electrical contacts required by prior art knobs which may be subject to conditions of bounce or electrical sparking.

The sensing coils forming part of the inductive sensing means may be combined with additional circuitry to permit data signals transmitted by a transponder (and most preferably a passive transponder) to be received, demodulated and communicated to a microprocessor. Such downloaded data can be used to set the control settings of the appliance in accordance with the received data, to reconfigure the appliance, to present information to the user, etc.

One advantage of the present invention is that it enables an inexpensive, simple, robust, easily fitted fascia plate to be used to provide all (or at least a large number of) the user-visible aspects of a man-machine interface. For many domestic appliances (such as washing machines), the internal operating elements of a number of different models are very similar, if not identical, and the main distinguishing features between different devices are the user-visible aspect of the man-machine interface. Therefore, by providing the user-visible aspects of the man-machine interface on a separate, essentially modular, component which may be fitted to the rest of the device at a very late stage in the manufacture of the device (even, for example, at a retail outlet), a manufacturer is able to produce a much wider range of "different" models at a much lower cost than that at which it is currently possibly to produce just a small range of "different" models, where each different model must be modified slightly to accommodate the different man-machine interfaces.

In many cases, a very simple, intuitive, robust fascia plate may be provided which satisfies all of the functionality required of the device to which it is fitted. Such an example is described in the third embodiment. Alternatively, the amount of control which a user can exercise over a device may be increased greatly by providing a number of different overlays, each of which may be designed to provide a convenient and intuitive means for allowing the user to input controlling information to the device (in effect taking advantage of the simplicity with which multiple man-machine interfaces may be applied to a device if remotely sensed user actuable elements are employed). The first embodiment described below is an example of such an application.

BRIEF DESCRIPTION OF THE DRAWINGS

In order that the present invention may be better understood, embodiments thereof will now be described, by way of example only, with reference to the accompanying drawings in which:

FIG. 9 is a table showing the various parameters which may be set using the man-machine interface of FIG. 1, the values which these parameters may take and the resonant frequency of resonant circuits used in pucks to control these parameters and the areas in which such pucks may be located;

DETAILED DESCRIPTION

First Embodiment

Figure 1:
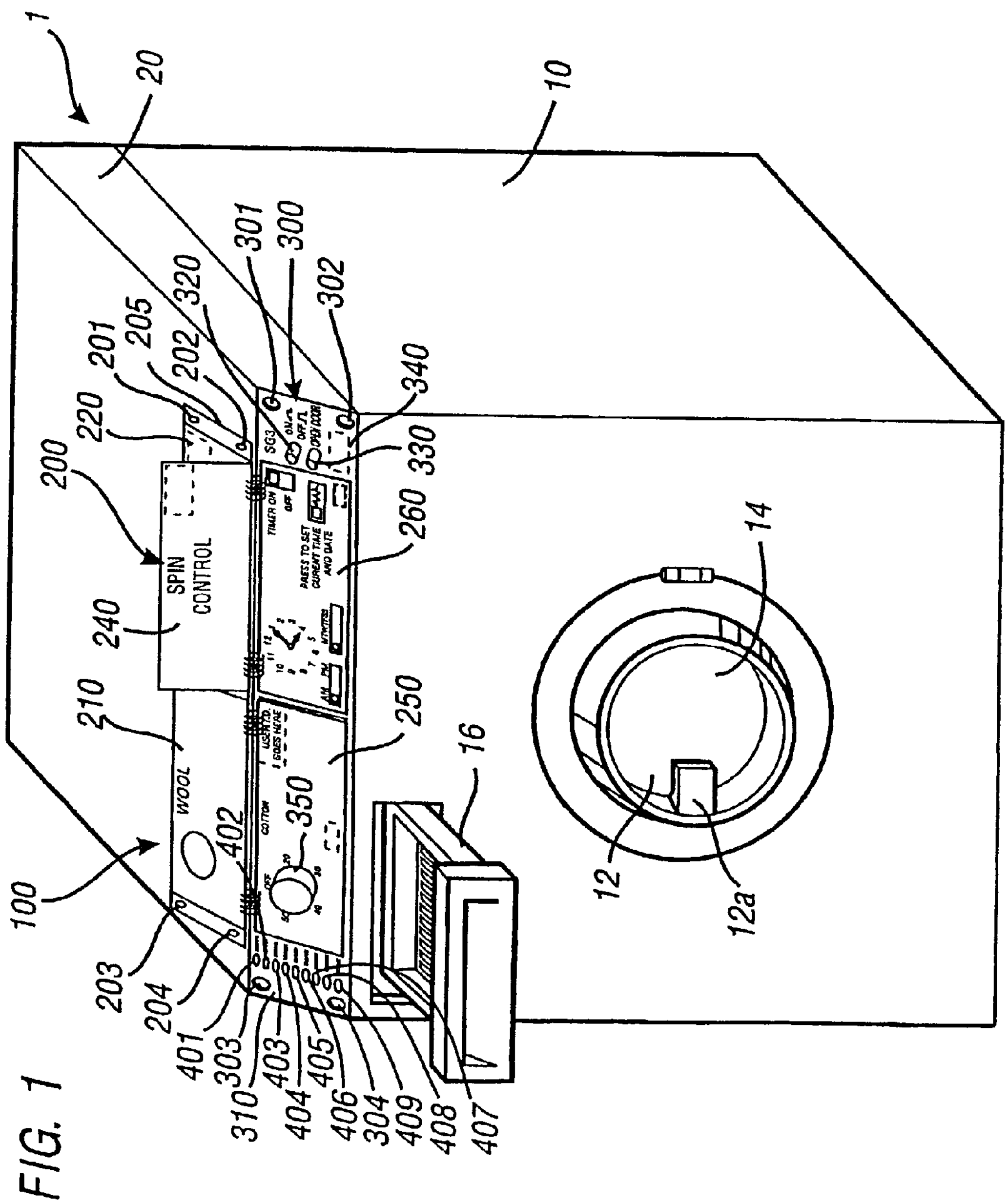
FIG. 1 is a schematic perspective view of a washing machine incorporating a man-machine interface according to a first embodiment of the present invention.

FIG. 1 shows a washing machine 1 having a main body 10 which houses a drum 14 into which dirty clothes to be washed may be placed. The main body 10 also includes a drum door 12 having a handle 12*a*, which opens into the drum 14 and a soap drawer 16. The washing machine 1 also includes a sealed box 20 which is fitted on top of the main body 10. In the present embodiment, the sealed box 20 houses the majority of the control circuitry for the washing machine 1 and also has a man-machine interface generally designated by the reference number 100 mounted on the front surface and the top surface of the sealed box 20 just behind the front surface.

The Man-Machine Interface (MMI) 100 includes a book 200 of six loose-leaf ring-bound graphical interface panels 210, 220, 230, 240, 250, 260 three of which are left panels 210, 230, 250 and three of which are right panels 220, 240 260 and which are mounted on a backing plate 205. The backing plate 205 is removably affixed to the top of the sealed box 20 by means of press fit peg fittings 201, 202, 203, 204. The MMI 100 also includes a fascia plate 300 which is removably affixed to the front surface of the sealed box 20 by means of press fit peg fittings 301, 302, 303, 304. The fascia plate 300 includes: a transparent portion 310 through which nine LEDs 401–409 may be viewed; an on/off button 320 for turning the machine between a ready to wash ON state and a standby or “off” state; an open door button 330 for allowing the drum door 12 to be automatically opened; a fascia plate ID puck 340 for identifying the type of fascia plate 300 currently attached to the sealed box 20; and a magnetic temperature control knob 350 which is rotatable between five different discrete orientations and which, in this embodiment, is used to set the temperature of the wash. As shown in FIG. 1, the temperature control knob 350 includes an arrow for indicating to the user the current orientation of the temperature control knob 350 and hence the current temperature setting.

To operate the washing machine 1 using the MMI 100, a user loads the drum 14 with clothes to be washed, closes the drum door 12 and loads washing powder into the soap drawer 16. The user then selects an appropriate left panel 210, 230, 250 depending on the nature of the clothes to be washed. If for example the clothes are made of cotton, the user pulls over onto the fascia plate 300 both the third and the second left panels 250, 230 to leave the front surface of the second left panel (which is marked cotton) facing the user, with the first left panel 210 (which is for use when washing woolen garments) remaining on top of the backing plate 205 (this is the position shown in FIG. 1). The user then turns the temperature control temperature control knob 350 until the arrow is pointing towards the desired temperature, as indicated on the second left panel 230 facing the user.

The user may then select further control options using the right panels 220, 240, 260. For example, with the first right panel 220, the user can set the duration of various subprogrammes, or simply select either a quick wash or a normal wash; or with the second right panel 240, the user can specify how the spin cycle is to be performed; or with the third right panel 260, the user can set a timer 261 so that the wash programme is carried out at some user specified time in the future (eg. such that the washing programme will finish just before the user returns home from work). To manipulate the controls on any of the right panels, the user simply places the panel into its operative position and then manipulates the appropriate slider bars, buttons and/or switches provided on those panels (to be described in greater detail below) into the appropriate positions for selecting the desired options. Once the user has set the appropriate control options, the washing cycle can be started by pressing the ON/OFF button 320. This will cause the washing machine to either commence washing or to move into a timer-on standby mode (indicated by an LED 409 as described in greater detail below) and await the designated time before automatically commencing the selected washing programme.

Figures 2A, 2B, 2C:
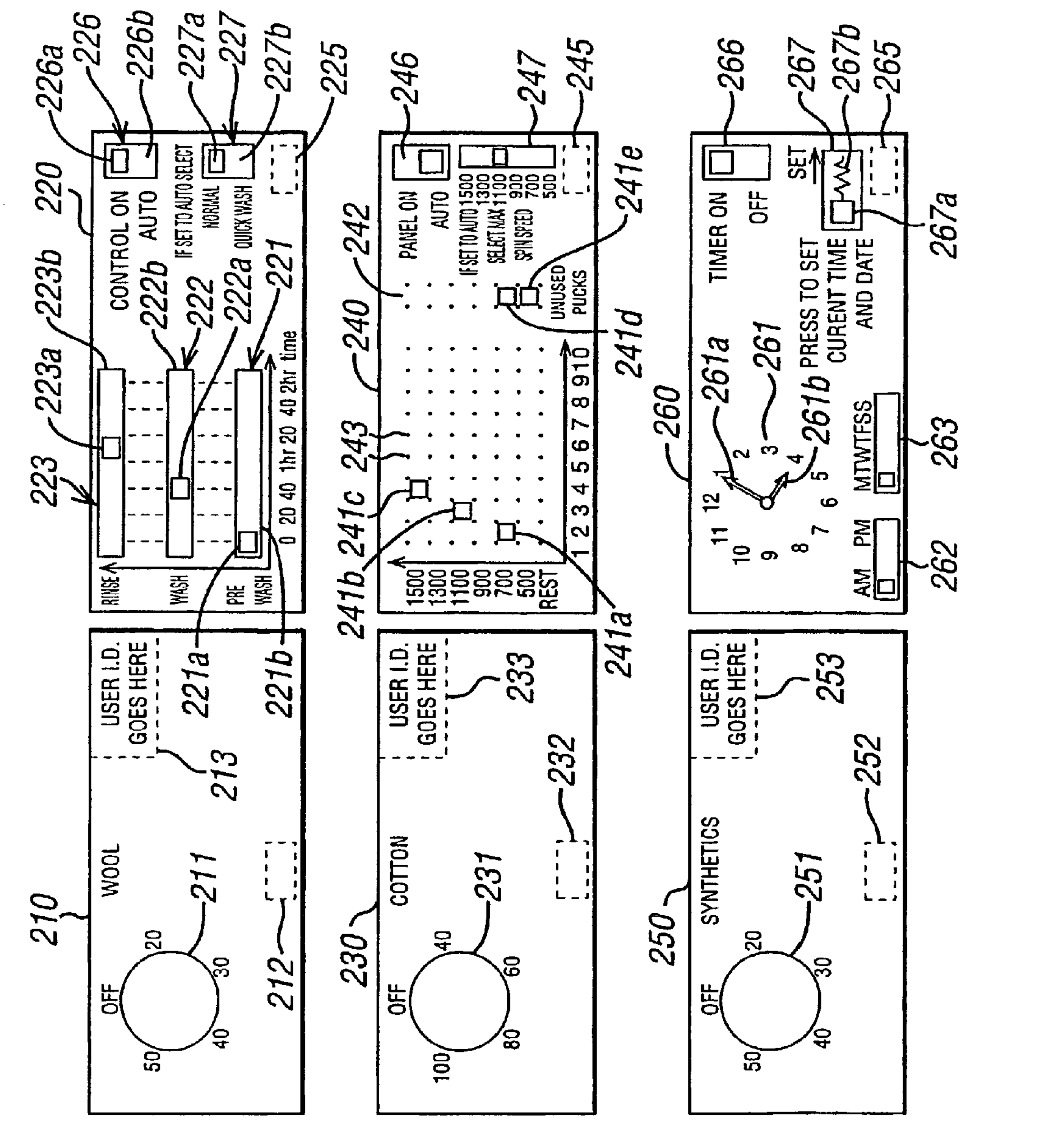
FIG. 2*a* is a front view of a wool programme temperature control left panel and a wash programme duration control right panel forming part of the man-machine interface of FIG. 1.
FIG. 2*b* is a front view of a cotton programme temperature control left panel and a spin duration control right panel forming part of the man-machine interface of FIG. 1.
FIG. 2*c* is a front view of a synthetics programme temperature control left panel and a timer control right panel forming part of the man-machine interface of FIG. 1.

FIGS. 2*a* to 2*c* are expanded plan views of the six panels 210–260 of the book 200. Referring firstly to FIG. 2*a*, the first left panel 210 is a wool programme temperature control panel. As shown, the panel 210 includes a circular hole 211 through which the temperature control temperature control knob 350 projects when the panel is lying over the fascia plate 300 in its operative position. Around the circular hole 211 different temperatures are printed at radially equally spaced positions. In the present example, five such positions are marked with associated values of: off, 20° C.; 30° C.; 40° C.; and 50° C. These markings correspond to the five different operative orientations which the temperature control temperature control knob 350 may adopt. The panel 210 also includes an embedded panel identifier puck 212 which is used to indicate to the control system (not shown) that panel 210 is currently in its operative position (i.e. affixed to the front surface of the sealed box 20). The wool programme temperature control panel 210 also includes a marked area 213 for receiving a user identification puck (not shown). The marked area 213 is indicated by a dotted line which demarcates the top right hand corner of the panel 210 and in which is printed “USER ID GOES HERE”. In the present example, a ferrite block (shown in FIG. 2*e*) is located behind the facia panel 300 substantially in registry with the marked designated area 213 when the panel 210 is in its operative position over the facia plate 300. The ferrite block (shown in FIG. 2*e*) cooperates with a magnet fixed within the user ID puck to hold the user ID puck securely in place when it is placed within the designated area 213 (provided the panel is in its operative position in registry with the fascia plate 300).

The user ID puck (not shown) is used to identify the user to the control system (not shown). Each legitimate user of the machine carries their own individual user ID puck with them and places it in the marked area when they wish to use the machine. The machine 1 will not function unless a valid user ID puck is detected; this provides security against unauthorised use of the machine. When the machine is sold, ten user ID pucks are provided and five of these only permit low temperature washes to be executed to prevent inexpert users from inadvertently damaging clothes by washing them at an inadvertently high temperature.

The first right hand panel 220 is a wash programme control panel. As shown in FIG. 2*a*, the panel 220 includes three sub-programme end time control slider bars 221, 222 and 223. The first slider bar 221 is a pre-wash duration slider bar which comprises a puck 221*a* which is slidable within a track 221*b*. As shown, a printed scale is provided along the track 221*b* which marks off 0 minutes up to 2 hours in 20 minute intervals. The user may select the end time of the pre-wash sub-programme by sliding the puck 221*a* along the track 221*b* until it comes into registry with the desired end time along the printed scale. A similar slider bar arrangement 222*a* and 222*b* is provided for the main wash sub-programme end time control and a slider bar 223*a* and 223*b* is provided for a rinse sub-programme end time control. In the example setting shown in FIG. 2*a*, the pre-wash has been set to end after 0 minutes (i.e. there will be no pre-wash), the main wash has been set to end after 40 minutes (so the main wash will have a duration of 40 minutes) and the rinse has been set to end after 1 hour and ten minutes (so the rinse will last for 30 minutes).

The first right hand panel 220 also includes an embedded identifier puck 225 which is used to indicate to the control system (not shown) that panel 220 is currently in the operative position. The panel 220 also includes a panel on/off switch 226 which comprises a puck 226*a* which is slidably mounted within a track 226*b*. The switch 226 can adopt either one of two distinguishable states depending upon the position of the puck 226*a* within the track 226*b*. The positions along the track 226*b* corresponding to these two different states of the switch 226 are marked "CONTROL ON" and "AUTO" respectively. When the puck 226*a* is in the position marked "CONTROL ON", the settings of the sub-programme end time control slider bars are taken into account by the washing machine 1. When the puck 226*a* is in the "AUTO" position the settings of the sub-programme end time control slider bars 221, 222 and 223 are ignored and the washing machine 1 instead operates using pre-stored default settings for the end times of the sub-programmes. The panel 220 also includes a quick wash select switch 227 which comprises a puck 227*a* which is slidably mounted within a track 227*b* such that the position of the puck 227*a* within the track 227*b* determines which one of two states the switch 227 is in. The positions along the track 227*b* are marked "NORMAL" and "QUICKWASH" respectively. When the panel on/off switch 226 is located in the "AUTO" position, the washing machine 1 will consider the position of the quick wash select switch 227 and it will set the durations of the sub-programmes either to the normal default settings if puck 227*a* is positioned next to the "normal" marking or it will set the durations of the sub-programmes to the quick wash default settings if the puck 227*a* is positioned next to the "quick wash" marking.

FIG. 2*b* shows the second left panel 230 and the second right panel 240. The second left panel 230 is a cotton programme temperature control panel. The panel 230 is similar to the wool programme temperature control panel 210 in that it includes a circular hole 231 for receiving the temperature control temperature control knob 350, an embedded panel identifying puck 232; and a marked area 233 onto which a user ID puck may be magnetically affixed. However, in the cotton programme temperature control panel 230 the different positions around the circular hole 231 are marked with different temperatures to account for the fact that cotton garments can generally be washed at higher temperatures than woolen garments.

The second right panel 240 is a spin control panel including a spin control grid arrangement 241, an embedded panel identifier puck 245, a panel on/off switch 246 and a max spin slider bar 247. The spin control grid arrangement 241 has seven rows marked "REST", "500", "700", "900", "1100", "1300" and "1500" and ten columns marked "1", "2", "3", "4", "5", "6", "7", "8", "9" and "10". A grid of upstanding pegs 243 is formed, integrally with the plastics material from which all of the panels 210 to 260 are formed, such that each marked row is bordered by two rows of pegs and each marked column is bordered by two columns of pegs. Between any four pegs, a marker puck 214*a*–214*e* may be removably affixed to locate the marker puck at the intersection of any marked column with any marked row. To programme the spin control grid arrangement 241, a user places one or more of the marker pucks in the desired locations to specify how many minutes (as marked out along the x-axis) a machine should spend at the spin rate marking the intersecting row (as marked out along the y-axis). For example, in the configuration illustrated in FIG. 2*b*, the first marker puck 241*a* has been placed at the intersection of the third row marked "700" and the second column marked "2" indicating that the spin cycle should commence with a spin at 700 rpm for 2 minutes; the second marker puck 241*b* has been placed at the intersection of the fifth row and the third column indicating that after spinning at 700 rpm for 2 minutes, the drum should be spun at 1100 rpm for a further 1 minute; the third marker peg 241*c* has been placed at the intersection of the seventh row and the fourth column indicating that the final part of the spin should be for 1 minute duration at 1500 rpm. In the configuration illustrated, the fourth and fifth marker pucks 241 d, 241 e are located in a holding arrangement 242 which stores unused pucks. The panel on/off switch 246 is similar to the panel on/off switch 226 of the first right hand panel 220 such that if the panel on/off puck 246*a* is in the "AUTO" position, the spin control grid arrangement 241 will be ignored and instead the setting of the maximum spin speed slider bar 247 will be taken into consideration. The maximum spin speed selection slider bar 247 is similar to the slider bars 221, 222, 223 of the first right hand panel 220 and has six settings of "500" rpm to "1500" rpm at 200 rpm intervals.

FIG. 2*c*, shows the third left panel 250 and the third right panel 260. The third left panel 250 is a synthetics programme control panel and is substantially similar to the first and second left panels 210, 230 in that it includes a circular hole 251 for receiving the temperature control temperature control knob 350 when the panel is located in its operative position over the fascia plate 300; an embedded panel identifier puck 252; and a marked area 253 for receiving a user identifier puck. The markings printed around the circular hole 251 are, in this embodiment, identical to those printed around the circular hole 211 of the first left panel 210.

The third right hand panel 260 is a timer control panel having: a clock arrangement 261 including a minute hand 261*a* and an hour hand 261*b* ; an AM/PM switch 262; a day-of-the-week slider bar 263; an embedded panel identifier puck 265; a panel on/off switch 266; and a time set switch 267. The AM/PM switch 262 is used to indicate whether the time shown by the clock arrangement 261 is morning or afternoon and the day-of-the-week slider bar 263 indicates the day of the week such that the washing machine 1 of the present embodiment may be set to come on up to seven days in advance. The timer control panel 260 can therefore be used to programme the washing machine 1 to come on at a specified future time by setting the clock arrangement 261, the AM/PM switch 262 and the slider bar 263 to the desired time and day such that when this user set time and day matches an internal clock and day indication, the washing machine runs the desired wash programme. The panel on/off switch 266 determines whether the timer is to be used or not and the set switch 267 is operable to set the current time and day of the internal clock and day indicator. To do this, a user manipulates the hands of the clock arrangement 261 to show the current time and ensures that the correct day of the week is indicated on the day-of-the-week slider bar 263 and sets the AM/PM switch 262 according to whether the current time is AM or PM. The user then slides the puck 267*a* of the set switch 267 against the bias of spring 267*b* and holds the puck 267*a* in this position for a predetermined period before releasing the puck 267*a* whereupon the washing machine will update its internal clock and day according to the set time all day.

Figure 2D:
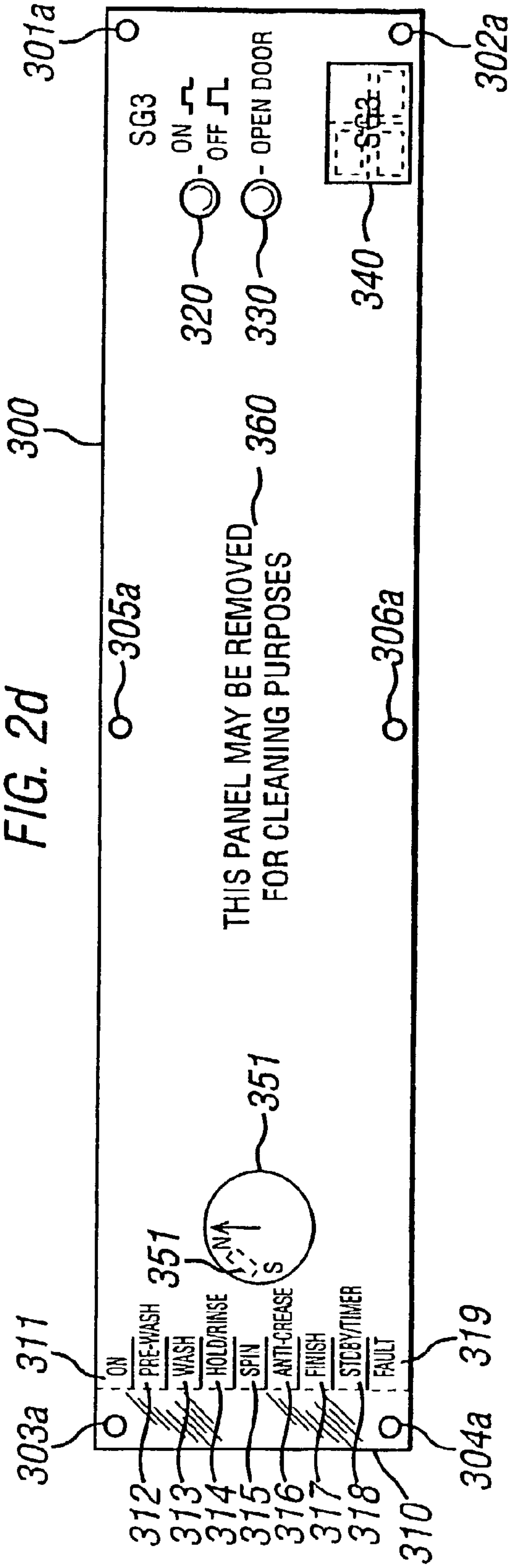
FIG. 2*d* is a front view of a fascia plate forming part of the man-machine interface of FIG. 1.

FIG. 2*d*, shows in more detail the fascia plate 300. As shown, the fascia plate 300 includes six fixing holes 301*a*–306*a* which receive corresponding fixing pegs integrally formed on the front surface of the sealed box 20. Alongside the transparent portion 310 are printed nine indicating words 311–319 each of which is arranged to line up with a corresponding one of the LEDs 401–409. In the present example, the corresponding words are "ON" 311, "PREWASH" 312, "WASH" 313, "HOLD/RINSE" 314, "SPIN" 315, "ANTI-CREASE" 316, "FINISH" 317, "STDBY/TIMER" 318, "FAULT" 319. The temperature control temperature control knob 350 includes a bar magnet 351 embedded therein along one edge portion of the temperature control temperature control knob 350 such that the position of the magnet 351 and hence the orientation of the temperature control temperature control knob 350 may be detected by the MMI 100 in a manner described in greater detail below. As mentioned above with reference to FIG. 1, the fascia panel 300 also includes an ON/OFF push-button 320 and an OPEN-DOOR push button 330. The fascia plate 300 also includes a fascia plate identification puck 340 which, as will be described in greater detail below with reference to FIG. 4*g*, identifies the fascia panel 300 attached to the sealed box 20. Finally, the fascia plate 300 also includes some printed matter 360 over the portion of the fascia plate 300 which is normally obscured by one or more of the panels 210–260. In the present embodiment, the printed matter 360 states that the panel (ie fascia plate 300) may be removed for cleaning purposes.

As will be described in more detail below, in this embodiment, the man-machine interface 100 is an inductive based interface in which all of the pucks and switches described above include a resonator operating at a respective predetermined resonant frequency and in which a set of excitation and sensor coils are provided behind the fascia panel 300 for sensing the position and orientation of the pucks and switches. In response to the sensed pucks and their position and orientation, the control system for the washing machine (not shown) controls the washing machine accordingly. For example, when both the third left panel 250 is located against the fascia panel 300 and the second left panel is located against the third left panel 250, the sensor coils of the MMI 100 will be able to detect the presence of both the panel identifying puck 232 and the panel identifying puck 252. The control system can therefore ascertain that the second left panel 230 is currently active and sets the control temperatures associated with the positions of the temperature control knob 350 accordingly. Similar determinations can be made with respect to the right panels and the moveable pucks associated therewith. As the reader will appreciate, by providing such inductive based pucks, no through holes are required in the sealed box 20 between the interface panels and the control electronics. Therefore, the MMI 100 is less susceptible to the ingress of water and other contaminants. Further, as will be appreciated from the general description given above, the exact operation of the washing machine can be controlled more easily by a user. Further, since the fascia panel and the control panels may be removed, a different fascia panel 300 and control panels may be mounted onto the washing machine to provide the user with different control options. In this case, the control system (not shown) would have to store different control data for the different fascias. The appropriate data for the currently connected fascia would then be retrieved from memory based on the fascia plate identification puck 340 which is detected by the sensor coils of the MMI 100.

Figure 2E:
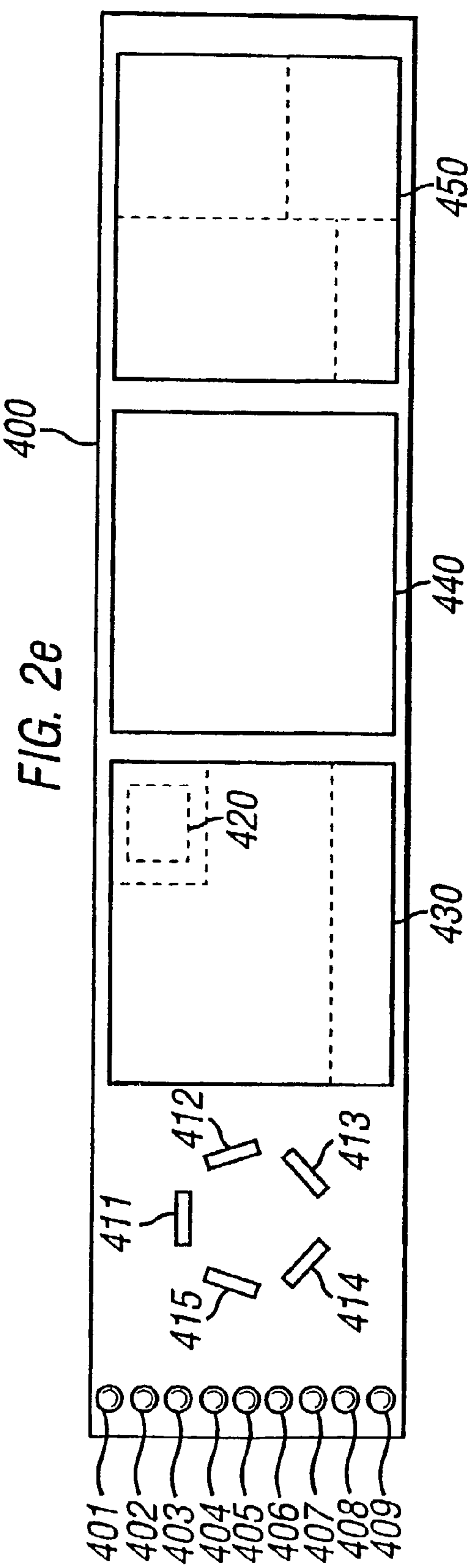
FIG. 2*e* is a schematic front view of a printed circuit board located behind the fascia plate of the appliance of FIG. 1 including sensor regions for sensing the position and orientation of pucks mounted on the panels and fascia plate of FIGS. 2*a* to 2*d;*

FIG. 2*e* is a schematic front view of a Printed Circuit Board (PCB) 400 on which the majority of the sensing electronic components of the MMI 100 are mounted. The PCB 400 is located immediately inside the sealed box 20 behind the front face thereof so as to be substantially in registry with the fascia plate 300. As seen in FIG. 2*e*, the PCB 400 has mounted thereon the LEDs 401–409. Also formed on the front face of the PCB 400 is a group of five reed switches 411 to 415 which are located so as to be in registry with the temperature control temperature control knob 350 and in particular such that each one of the reed switches is in registry with the bar magnet 351 for one of the five possible orientations of the temperature control temperature control knob 350. The reed switches 411 to 415 are arranged such that when the bar magnet 351 is in registry with a reed switch, that particular reed switch (but only the one particular reed switch in registry with the bar magnet) will close to permit a current to pass therethrough and this is detected by suitable reed switch processing circuitry which is located on the underside of the PCB 400.

The PCB 400 also includes a block of ferrite material 420 located on the underside of the PCB 400 so as to be substantially in registry with the marked areas 213, 233, 253 on the left panels 210, 230, 250 which are for receiving a user ID puck. The PCB 400 also has formed thereon three (labelled A, B and C) x-y sensing tablets 430, 440, 450. Each x-y tablet comprises a number of coils which may be excited, in a manner described in greater detail below, to enable the position and/or orientation of the pucks and switches in registry with the particular tablet to be sensed. In this embodiment, each of the three x-y tablets are identical in structure.

IG. 3 is a schematic block diagram of the washing machine 1 illustrating sensing elements 430, 440, 450, 510, 520, 530, 560, 570, 550, 411 to 415 and 580, a control unit 700 and controlled elements 30, 40 50, 401–409 and 60. The block diagram illustrates how information from the sensing elements is passed to the control unit which in turn generates controlling signals for controlling the controlled elements. As shown, the sensing elements include a number of coils which are used in inductive position sensing of targets and two additional blocks of sensing elements, namely the interface LEDs 411–415 and a temperature sensor 580. The coil sensing elements include: the A, B and C x-y tablet coils 430, 440, 450; water level sensing coils 510; drum-door-open sensing coils 520; soap-drawer-open sensing coils 530 drum-shaft-rotation sensing coils 560 and motor-shaft-rotation sensing coils 570; and drum-mass-and-vibration sensing coils 550.

As will be appreciated by a person skilled in the art of inductive position sensing, the various sensing coils 430, 440, 450, 510, 530, 540, 560, 570, 550 generate signals which, in this embodiment, are selectively received by the control unit 700 and processed to determine the position and/or orientation of the pucks, sliders, switches etc. The control unit 700 then takes the appropriate control action based on the determined positions and/or orientations. In the case of the MMI A, B and C x-y tablets 430, 440, 450, this positional and/or orientation information is used to identify the values of various user settable parameters which in turn is used to configure the washing machine 1 to perform a washing programme in accordance with the parameters set by the user.

The water-level sensing coils 510 generate signals from which the control unit 700 identifies the position of a floating puck which is indicative of the amount of water in the drum. This positional information is then used to control the amount of water added to or removed from the drum 14 during a washing programme.

The drum-door-open sensing coils 530 and soap-drawer-open coils 540 generate signals which are indicative of the position of corresponding resonant pucks mounted on the drum door and the soap-drawer. The control unit 700 then processes these signals to determine whether the drum door 12 and soap drawer 16 respectively are closed or open. In this embodiment, this information is used by the control unit 700 to ensure that a washing programme is not commenced until the drum door 12 and the soap drawer 16 are both closed. In this embodiment, the control unit is also able to identify what type of soap drawer is fitted by detecting the resonant frequency of the corresponding puck. This enables the control unit 700 to automatically ensure that it adapts its behaviour to account for different types of soap drawer and ways of inserting soap into the machine to accommodate differences in this respect between different market countries.

The drum-shaft-rotation sensing coils 560 and the motor-shaft-rotation sensing coils 570 are mounted around the drum shaft (not shown) and motor shaft (not shown) respectively and generate signals which indicate the speed of rotation of corresponding pucks mounted on the drum shaft and motor shaft respectively. The control unit 700 then processes these signals during the washing programme to obtain the speed of rotation of both the drum shaft and the motor shaft which it can correct accordingly if necessary, or stop and indicate a fault if belt slippage is detected.

The drum mass and vibration sensing coils 550 generate signals indicative of the position of a resonant puck which is attached to a bearing unit supporting the drum 14. The control unit 700 then processes these signals to determine, during a washing programme, the weight of the drum and hence the weight of the contents of the drum. In the present embodiment, the measured weight of the clothes in the drum is used to determine how much water should be used during the programme to provide an automatic "half-load" function. The control unit 700 also processes these signals to determine the amplitude and frequency of vibration of the drum (in the present embodiment in the vertical direction only) which is used to reduce the speed of rotation of the drum if the energy of the vibrations exceeds a predetermined maximum value, and, in the present embodiment, to activate a load re-arrangement sub-cycle in which the drum is rotated back and forth in an attempt to distribute the clothes within the drum more evenly. Note that to measure the angle of rotation forwards and backwards during the rearrangement cycle to correspond to previously calculated optimum values, the drum-shaft-rotation sensing coils 560 are used.

Figure 3:
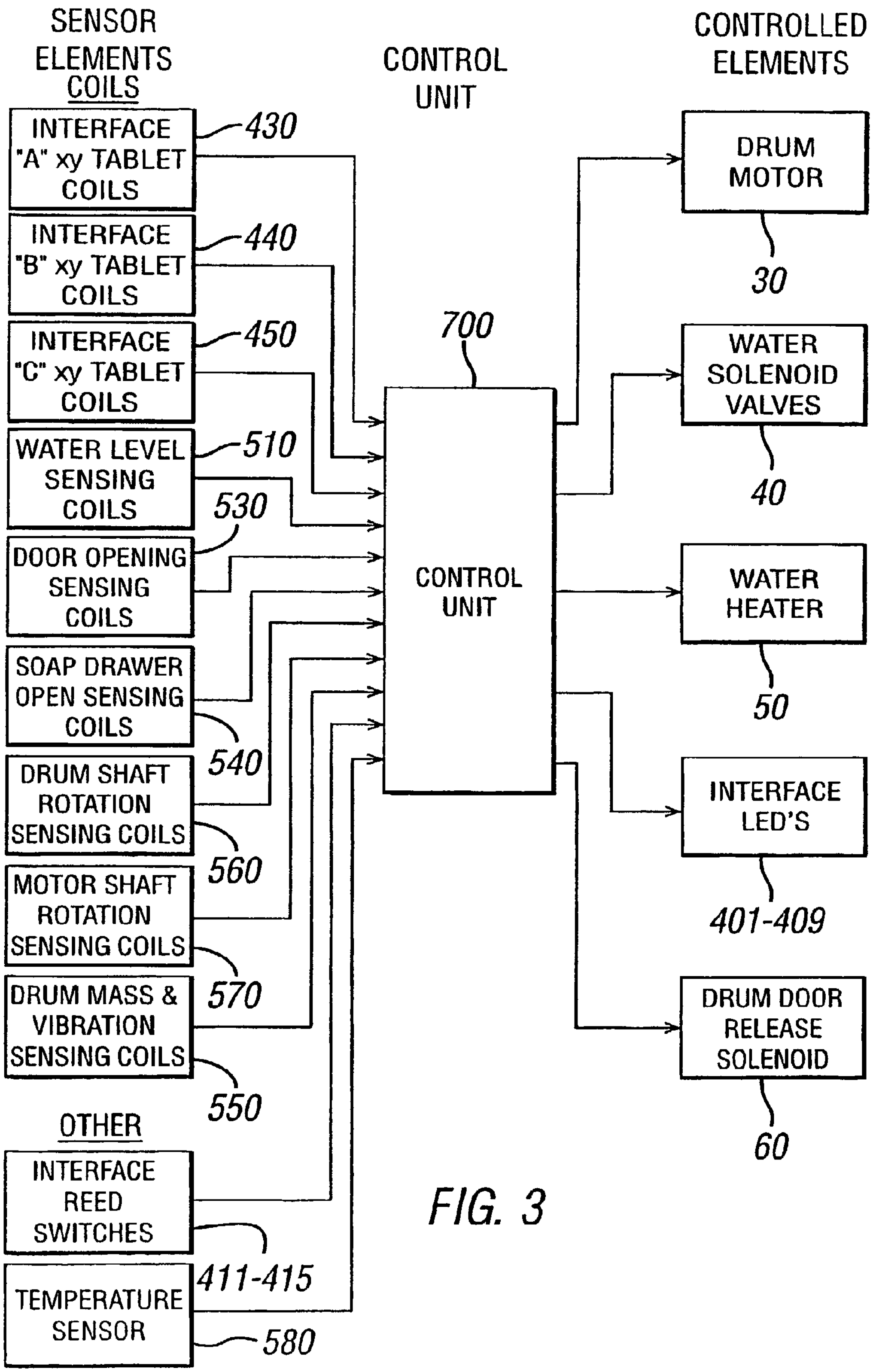
FIG. 3 is a schematic block diagram of the electrical components of the washing machine of FIG. 1 illustrating how a number of sensing elements are connected to a common control unit which, in turn, is connected to a number of controlled elements.

As shown, in FIG. 3, the controlled elements include the drum motor 30 which is controlled by the control unit 700 in a conventional manner and will not be described further. The drum motor 30 drives a drive shaft which is connected via a drive belt to the drum shaft which is connected to the drum 14. The drum shaft and drum 14 are rotatably supported by bearing surfaces which are mounted on a suspension which absorbs vibrations of the drum during its rotation at a high speed. This reduces the amount of vibration transmitted to the main body 10 and sealed box 20.

The controlled elements also include water solenoid valves 40 which are controlled by the control unit 700 to control the flow of water: a) into the drum 14; b) through the soap drawer compartment 16; and c) out through a waste outlet (not shown). The operation of these solenoid controlled valves 40 is controlled by the control unit 700 in accordance with the control parameters which specify the details of the particular washing programme. A water heater 40 is controlled by the control unit 700 to heat the water contained within the drum 14 to the temperature in accordance with temperature profile parameters of the particular washing programme.

The controlled elements also include the interface LEDs 401–409 which are also controlled by the control unit 700. The LEDs are mainly used to indicate what particular sub-programme of a complete wash programme the washing machine 1 is performing at any one time. Thus LED 312 indicates that the machine is currently executing a prewash sub-programme; LED 313 indicates that the washing machine is currently executing a main wash sub-programme; LED 314 indicates that the washing machine is currently executing a hold and rinse sub-programme; LED 315 indicates that the washing machine is currently executing a spin operation; LED 316 indicates that the washing machine is currently executing an anti-crease sub-programme; and LED 317 indicates that the washing machine 1 has finished its washing programme and is waiting for the user to open the door 12 and remove the washed clothes from the drum 14. LED 311 is a general "ON" indicator to indicate that the machine is switched on; LED 318 indicates that the machine is in a "TIMER-ON" standby mode and will turn on automatically at a future time, set using the timer control panel 260; and LED 319 indicates that a fault with the operation of the machine has been detected so that the user may contact an engineer to have the machine serviced. An example of an occurrence which, in the present embodiment, causes the fault LED 319 to be illuminated is the detection, by the control unit 700, that the drum shaft is rotating at a slower speed than the motor shaft, which indicates that the drive belt connecting the motor shaft, to the drum shaft is slipping.

The control unit 700 also controls a drum door release solenoid 60 which (when activated by the control unit 700) causes a catch, which normally operates to hold the door in a closed position, to release the door 12, allowing it to spring outwardly under the biassing force of a spring (not shown) which is energised by the user closing the door 12.

FIGS. 4*a* to 4*d* illustrate the sensing coils which are used in the present embodiment for determining the x and y positions of the resonant pucks, sliders and switches of the MMI 100 in registry with the sensing coils. In use, these sensing coils are superimposed over each other using different layers of the PCB to avoid connections between the conductors forming each of the coils. In this embodiment, the coils used for determining the y position are the same as those used for determining the x position but rotated through 90°.

A brief description of the form of the coils used for determining the x position will now be given with reference to FIGS. 4*a* and 4*b*. As shown, each of the coils 461 and 462 extends in the x direction over the entire active length of the tablet (which in this embodiment is 80 mm) and over the entire active width of each tablet (which in this embodiment is also 80 mm). In this embodiment, the coils 461 and 462 are arranged to provide an output signal whose amplitude varies approximately sinusoidally with the relative position of a resonating puck that is within the sensing range (out of the page) of the coils 461, 462 along the x direction of the x-y tablet 430, 440, 450.

Figure 4A:
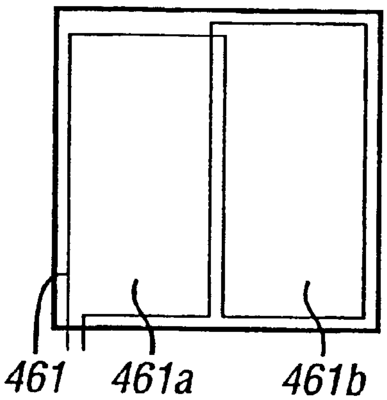
FIGS. 4*a* to 4*e* are schematic front views of the coils within one of the sensing regions on the printed circuit board shown in FIG. 2*e;*

Referring to FIG. 4*a*, the coil 461 extends in the x direction and is shown as comprising a single period having two alternate sense loops 461*a* and 461*b* giving the coil a period or pitch (λ) of 80 mm.

Figure 4B:
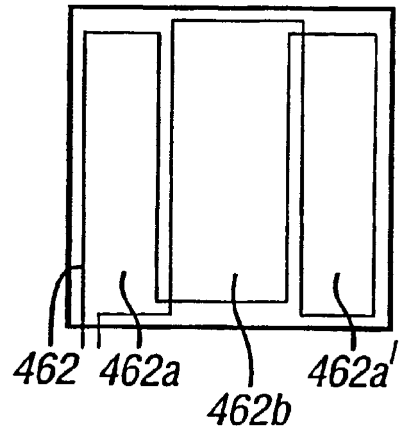

The coil 462 shown in FIG. 4*b* is also formed by a single period of alternating sense loops 462*a*, 462*a*' and 462*b* and therefore has the same pitch (λ) as coil 461. However, the loops of winding 462 are shifted along the x direction by λ/4, so that the coil 461 and 462 constitute a phase quadrature pair of windings. In order that both windings 461 and 462 extend over the same length, the loops 462*a* and 462*a*' (located at the ends of the tablet 430, 440, 450) are both wound in the same sense but extend in the x direction for only a quarter of the pitch λ. This maintains the balance between the number of and the area enclosed by each of the two types of loops 461 a, 462*a*, 462*a*' and 461*b*, 462*b* which minimises the sensor coil's sensitivity to external magnetic fields.

Figure 4C:
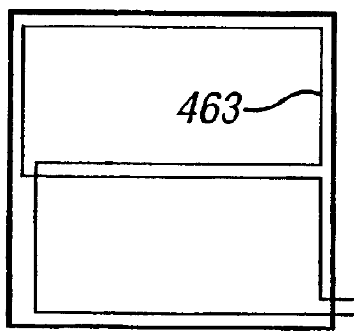
Figure 4D:
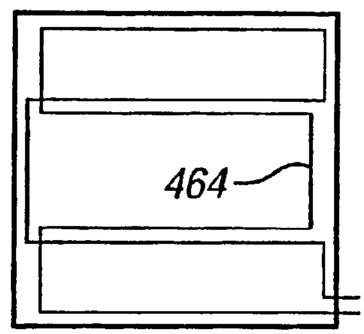
Figure 4E:
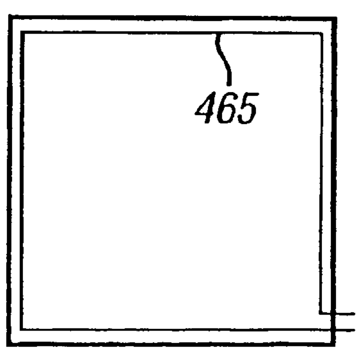

As shown in FIGS. 4*c* and 4*d*, the y direction loops are identical to the x direction loops 461, 462 except that they have been rotated by 90°. FIG. 4*e* illustrates an excitor coil 465 which, in this embodiment, comprises a single coil extending around the periphery of the x-y tablet. It will be understood by a person skilled in the art of inductive position sensing that the x-y tablet having the above five identified coils can be used to determine the x and y position of a resonant puck located above the x-y tablet by performing the following steps:

1. applying an alternating square wave voltage signal to the excitor coil 465 to generate an alternating electromagnetic field in the vicinity of the tablet; the frequency of the driving voltage corresponding to the resonant frequency of a target resonant puck, button, slider etc to be interrogated;

2. removing the excitation voltage from the excitor coil after it has been applied for a predetermined period and sensing the voltage signal induced in the first sensor winding 461 (if a puck having the correct resonant frequency is within the sensing range of the sensing coil 461, then the resonator in the puck will have been energised by the excitation voltage and it will resonate at its resonant frequency and this will induce a corresponding oscillating voltage within the sensing coil 461);

3. processing the oscillating signal received in the sensing coil 461 to determine a signal level dependent on the position of the puck relative to the sensor coil 461;

4. repeating the above procedure but sensing the voltage signal induced in the quadrature x sensor coil 462;

5. using the processed signals from both sensor coils 461 and 462 to determine the position along the x axis of the resonating puck; and 6. repeating the above procedure with respect to the y direction coils 463 and 464.

In the above description of the x-y sensing coils, only a single period is used to reduce the complexity of the discussion. However, multi-period sensor coils are used in practice. In the multi-period case, a mechanism to resolve the period ambiguity is required. Full details about the multi-period sensor coils of the currently most preferred arrangement of the x-y sensing coils and general principles of inductive position sensing may be found in the applicant's earlier PCT application WO98/58237, the contents of which are hereby incorporated by reference. Note that the processing of the signals is not based on the absolute magnitude or phase of the received signals but on their relative magnitudes or phases.

Figure 4F:
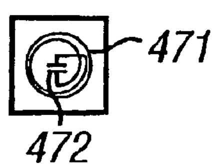
FIG. 4*f* is a schematic illustration of a puck which may be sensed by the sensing regions of the printed circuit board of FIG. 2*e;*

FIG. 4*f* illustrates the basic form of the pucks, slides, buttons etc. used in the MMI 100, such as the marker pucks 241A to 241E; the pucks which form the buttons within the switches 226, 227, 246, 262, 266 and 267; the embedded panel identification pucks 212, 225, 232, 245, 252 and 265; the pucks which form the buttons within the slider bar arrangements 221, 222, 223, 247 and 263; the pucks within the hands 261A, 261B of the clock arrangement 261; and the pucks within the push buttons 320, 330. As shown, each such puck includes a coil 471 and a capacitor 472 connected across the ends of the coil 471 to form a resonant circuit. The inductance of the coil 471 and the capacitance of capacitor 472 for each puck are chosen so that the puck has a predetermined resonant frequency. The or each resonant circuit in each puck has a quality factor, Q (which is given by $Q=(L/CR^2)^{1/2}$ where L is the self inductance of the coil, C is the capacitance of the capacitor and R is the total resistance of the circuit), which is determined by the characteristics of the components used to form the or each resonant circuit. In the present embodiment, the quality factor, Q, which is consistently exceeded (given the characteristics of the components used, manufacturing tolerances, etc.) is such that, for a drive frequency of approximately 2 MHz, approximately 20 distinct resonant frequencies may be reliably discriminated from one another. Therefore, in the present embodiment, each resonant circuit is chosen to have one of 20 distinct resonant frequencies $f_1$ to $f_{20}$. In this way, each resonant circuit may be reliably caused to resonate at its particular resonant frequency by means of the excitation signal applied to one of the excitor coils 465 at the appropriate frequency, without causing neighbouring pucks, having different resonant frequencies, to also resonate with sufficient energy to interfere with the desired signals from the correct puck.

Figure 4G:
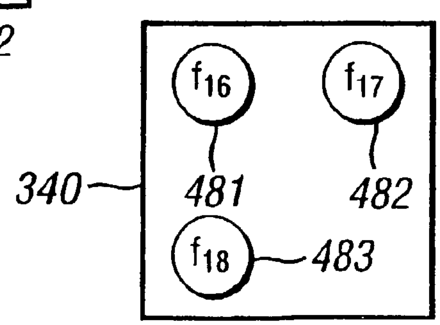
FIG. 4*g* is a schematic illustration of an identification ID puck comprising a plurality of individual resonant circuits having a predetermined position in relationship to one another.

FIG. 4*g* illustrates the general structure of the fascia plate ID puck 340. As shown, the ID puck 340 comprises 3 resonators 481, 482, 483 having resonant frequencies $f_{16}$, $f_{17}$, $f_{18}$ respectively. The resonant frequencies of the resonators within the ID puck 340 may be selected from any three of the resonant frequencies $f_{16}$ to $f_{20}$ and the relative positions of these resonators within the ID puck 340 may be varied to generate a large number of different combinations, thereby allowing different fascia plates to be identified using the same three resonant frequencies. For example, in the present embodiment, each resonator 481, 482, 483 can occupy any one of four distinct possible positions, with no two targets occupying the same position, such that the number of different combinations available is 6×24=144. In the present embodiment, each user ID puck is similar to the fascia plate identifier puck 340. As those skilled in the art will appreciate, it is possible to provide greater security to prevent unauthorised persons from "guessing" the correct resonator combination (ie attempting to defeat the security by trying different possible combinations) for a particular user ID puck by increasing the number of frequencies available from which to choose the frequency of each resonator and/or by increasing the number of different positions in which individual resonators may be positioned within the identification puck. Increasing either of these factors causes the number of different possible combinations to increase approximately exponentially.

Figure 5A:
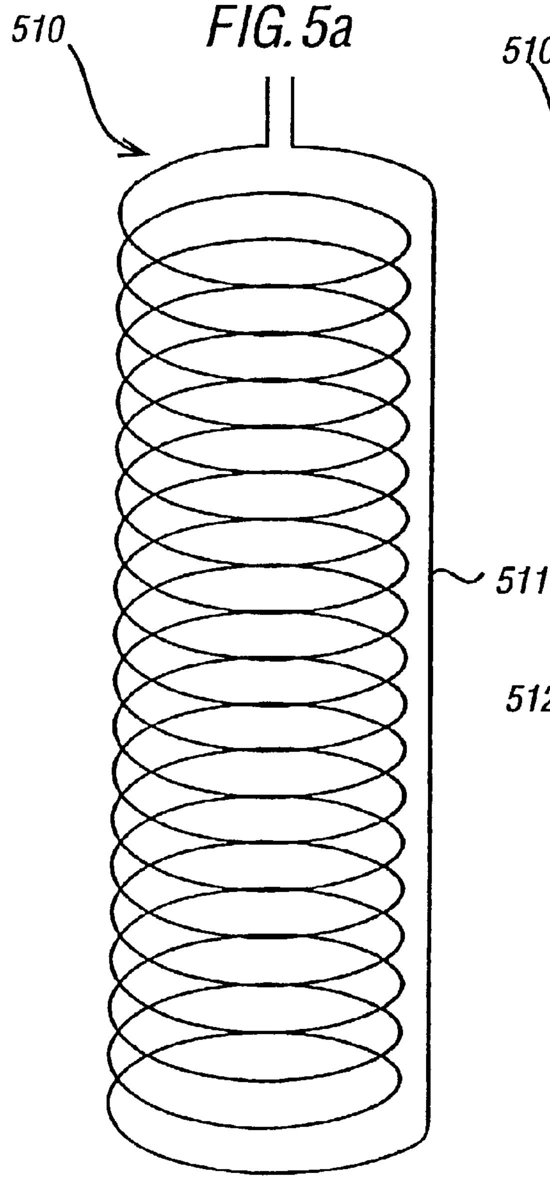
FIGS. 5*a* and 5*b* are schematic illustrations of excitor and sensor windings suitable for detecting the level of water contained within the drum of the washing machine of FIG. 1.
Figure 5B:
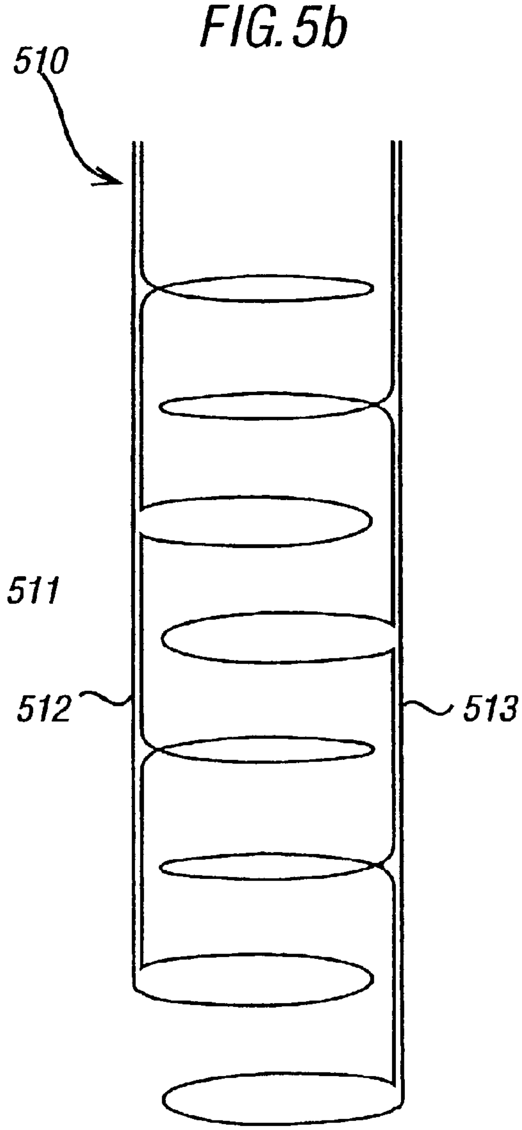
Figure 5C:
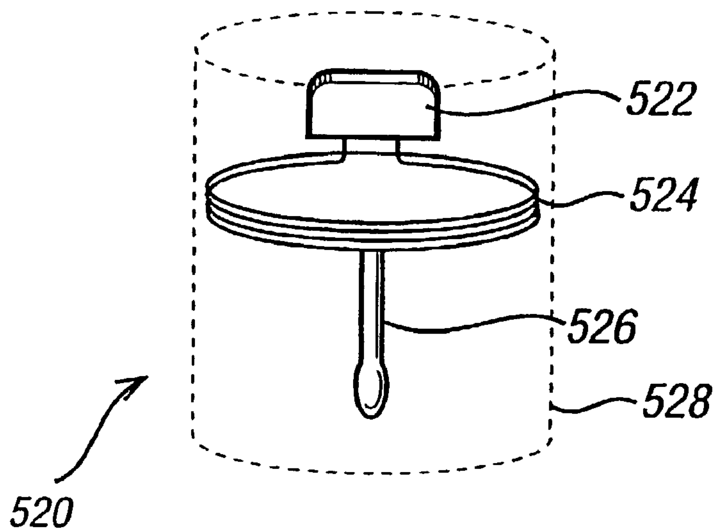
FIG. 5*c* is a schematic illustration of a floating puck which may be sensed by the sensor coils of FIG. 5*b;*

FIGS. 5*a* and 5*b* illustrate the form of water level sensing coils 510 used in this embodiment. Although not shown, these coils are mounted coaxially with each other and extend over the same measurement range. These coils are mounted around a measuring tube (not shown) which is mounted to the main body 1 and is in fluid communication with any water contained within the drum such that the level of water within the measuring tube is indicative of the level of water within the drum. As shown, the sensing coils 510 include an excitor coil 511 illustrated in FIG. 5A and quadrature sensor coils 512, 513 illustrated in FIG. 5*b*. A floating puck 520 within the measuring tube whose position may be sensed by means of the water level sensing coils 510 is illustrated in FIG. 5*c* and comprises a capacitor 522 which is connected across the ends of an inductor coil 524 to form a resonant circuit, a weight 526 for causing the puck 520 to float in a particular orientation and a float body 528 within which the other components of the puck 520 are mounted. The operation of the water level sensing coils 510 is substantially similar to the operation of the x-y sensing tablets and will not be described here in detail except to note that since the quadrature coils 512 and 513 extend over multiple periods, it is not possible to unambiguously identify the height of the puck 520 at any particular time by comparing the signals generated in the quadrature sensing coils 512, 513 since these will only identify the position of the target 520 within one spatial period of the coils. In this embodiment, to overcome this problem, the control unit 700 assumes that at the start of each washing programme the puck 520 will be in the same position (namely the position when no water is in the drum) and thereafter the control unit 70 keeps a continuous record of which spatial period the floating target 520 is within as the water level rises and falls during a washing programme. Further details about the operation of a liquid level sensing arrangement of this type may be found in the Applicant's co-pending PCT patent application Number GB00/02329, the contents of which are hereby incorporated by reference.

Figure 5D:
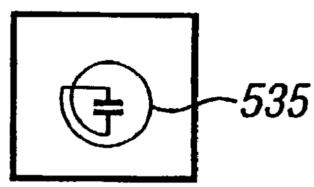
FIG. 5*d* is a schematic illustration of a puck including a resonant circuit which may be attached to the drum door or soap drawer of the washing machine shown in FIG. 1.
Figure 5E:
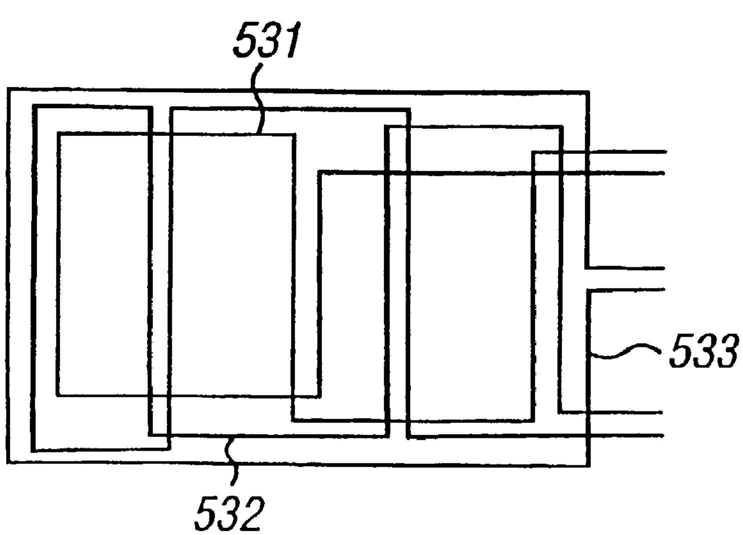
FIG. 5*e* illustrates a linear coil arrangement for sensing the puck of FIG. 5*d* to permit detection of whether the soap drawer or drum door of the washing machine of FIG. 1 is closed.

FIG. 5*e* illustrates the form of the drum-door-open sensing coils 530 and the soap-drawer-open sensing coils 540. As shown, these comprise single period, one-dimensional, quadrature sensor coils 531 and 532 and a single loop excitor coil 533. The operation of these coils is substantially identical to that of the x coils shown in FIGS. 4*a*, 4*b* and 4*e* described above and will not therefore be described again. In the present embodiment, the form of the pucks which the sensor coils 531 and 532 detect is shown in FIG. 5*d*. As shown, each puck includes a single resonator 535 substantially identical to that shown in FIG. 4*f* described above. In the present embodiment, the drum-door-open sensing coils 530 are located alongside the door catch which holds the drum door 12 in place when it is closed, and the puck 535 to be detected is mounted on the co-operating part of the drum door 12 such that it only comes into sensing range of the sensing coils 520 when the door is closed. Thus when the control unit 700 receives signals indicative of the presence of the puck 535, it knows that the drum door 12 is closed. If it does not receive any signals at the appropriate frequency, then it knows that the puck 535 is not there and hence that the door 12 is open. A similar arrangement is used with the soap-drawer-open sensing coils 530 to detect whether the soap drawer 16 is open.

Figure 5F:
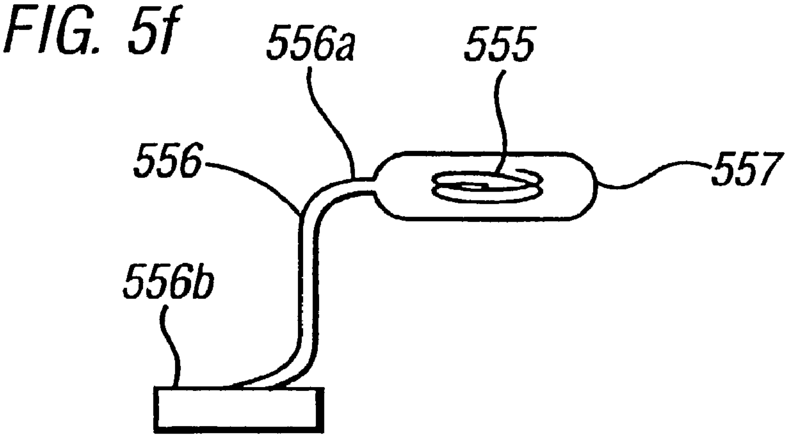
FIG. 5*f* is a schematic illustration of a target element suitable for mounting onto a bearing supporting a shaft which in turn supports the drum within the washing machine of FIG. 1.
Figure 5G:
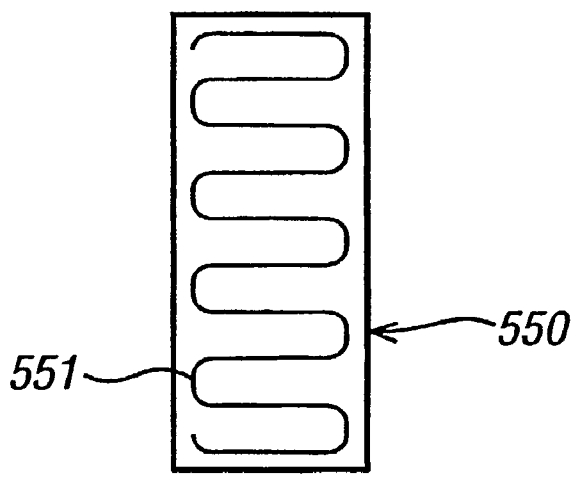
FIG. 5*g* is a schematic illustration of a linear sensing coil arrangement for detecting the position of the target element of FIG. 5*f* whereby the displacement of the drum of the washing machine of FIG. 1 may be measured.

FIG. 5*g* is a schematic illustration of the drum-mass-and-vibration sensing coils 550. In the present embodiment, the sensing coils 550 include two pairs of quadrature linear coils (schematically illustrated in FIG. 5*g* by the single multiple period winding 551) having different pitches such that, in this embodiment, the number of spatial periods occupied by one pair of coils is exactly one less than the number occupied by the other pair of coils to produce a vernier scale along the measurement direction. Furthermore, in the present embodiment, no separate excitor coil is used; instead, the quadrature coils are used both as excitor windings and as sensor windings. For more details of how such an arrangement operates, the reader is referred to the applicant's earlier PCT patent application WO98/58237 referred to above.

In this embodiment, a puck 557 (shown in FIG. 5*f*) having a single target 555 substantially identical to that shown in FIG. 4*f* is mounted on one end 556*a* of a cantilever 556, the other end 556*b* of which is mounted to a bearing supporting the drum shaft, such that as the drum 12 moves up and down on the suspension supporting the drum and drum shaft, the puck 557 moves too.

The sensing coils 550 are secured to the main body 10 such that these will remain relatively stationary as the drum and drum shaft move up and down. The puck 557 and sensing coils 550 are mounted relative to one another such that the resonator 555 within the puck 557 is always within sensing distance of the sensing coils 550, and, as the drum moves up and down, the puck 557 moves up and down along the measuring path of the sensing coils 550.

In the present embodiment, the drum 12 tends to move a greater distance up and down than the bearing supporting the drum shaft such that the bearing also rotates slightly as the drum moves up and down. By placing the puck 557 at the end 556*a* of the cantilever 556, in addition to the puck 557 following any vertical linear movement of the bearing, the rotational movement of the bearing is also converted into a related circumferential movement of the puck 557 having a large vertical linear component such that the sensing arrangement of the present embodiment may also detect this rotational movement of the bearing which will be proportional to vertical movement of the drum. The relationship between linear movement of the puck 557 as detected by the sensing coils 550 and vertical movement of the drum 12 is determined by experiment. In the present embodiment, a simple threshold of a maximum acceptable vibration of the drum at different frequencies is correlated by experiment with the detected frequency and amplitude of vibration of the puck 557. If, during a washing programme, this correlated or threshold amplitude of vibration is exceeded for any frequency of vibration, then corrective action is taken by the controller 700 to reduce the vibrations. Such corrective action firstly comprises stopping rotation of the drum and then rotating the drum backwards and forwards a few times to try and level out the load before continuing with the washing programme. If this strategy is unsuccessful (ie the threshold amplitude of vibration is still exceeded), then the speed of rotation of the drum is reduced until the measured amplitude of vibration falls below the threshold amount.

In the present embodiment, the frequencies of vibrations which represent a large amount of energy (and are therefore potentially problematic) tend to be less than 50 Hz. In the present embodiment, the resonant frequencies of the pucks are of the order of 2 MHz and approximately ten pulses or periods of an excitor coil are required at the resonant frequency to get the resonator within each puck to resonate with sufficient energy to permit its position to be detected. Even allowing two orders of magnitude for time taken to measure the induced voltage signal in each sensor coil and allowing for several different measurements to be made with different coils, the maximum sampling frequency (ie the maximum frequency with which the position of a target may be detected) is of the order of 2 kHz which is ample for obtaining accurate information about both the frequency and the amplitude of the vibrations made by the drum 12.

Figure 5H:
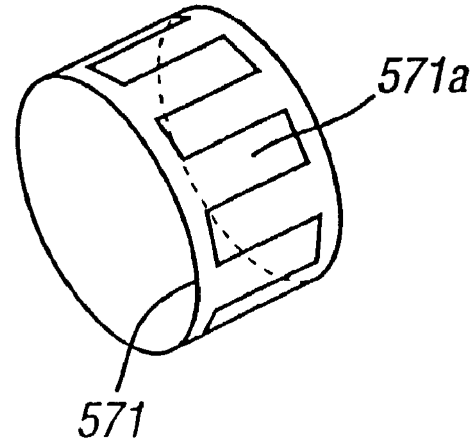
FIG. 5*h* is a schematic illustration of a linear track of sensing coils wrapped into a cylindrical shape for measuring the rate of rotation of a motor shaft or drum shaft of the washing machine of FIG. 1 when a suitable resonant circuit is mounted to the shaft to be monitored.

FIG. 5*h* is a schematic illustration of the form of both the drum-shaft-rotation sensing coils 560 and the motor-shaft-rotation sensing coils 570. As shown, they take the form of a linear track of coils bent around a cylinder 571. In the present embodiment, the coils used are identical to those used in the linear track 550 described above with reference to FIG. 5*g*. The cylinder 571 is mounted around the shaft whose rotation is to be measured (ie the drum shaft for coils 560 and the motor shaft for coils 570), but is attached to a non-rotating element (such as a bearing housing) so that the shaft rotates inside the cylinder relative to the coils 571. A simple puck (not shown) having a single resonator is mounted on the surface of the shaft substantially in registry with the centre 571*a* (in the axial direction) of the cylinder 571. As the puck rotates with the shaft, its position along the linear track of sensor coils 570 moves and this is detected by the control unit 700. As noted above, the system is easily able to sample the position of a target in the present embodiment at a sample rate of up to 2 kHz. The maximum speed at which the drum shaft or motor shaft of the present embodiment is rotated is 1500 rpm, which corresponds to about 25 Hz, (most washing machines have a maximum spin speed of less than 2000 rpm). Therefore, the sensing coils 550 are easily able to monitor the speed of rotation of the drum and motor shafts.

Figure 6A:
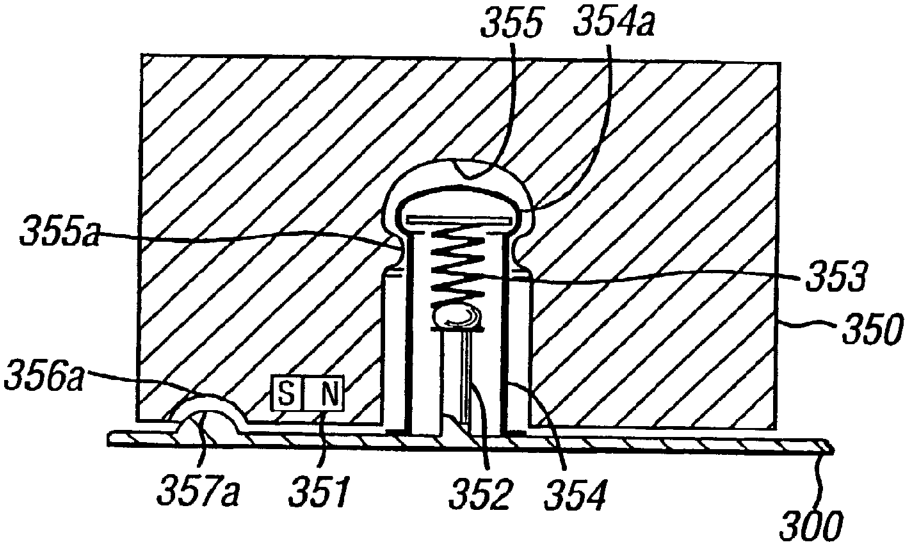
FIG. 6*a* is a cross-sectional view through a control knob mounted onto the fascia plate of FIG. 2*d;*
Figure 6B:
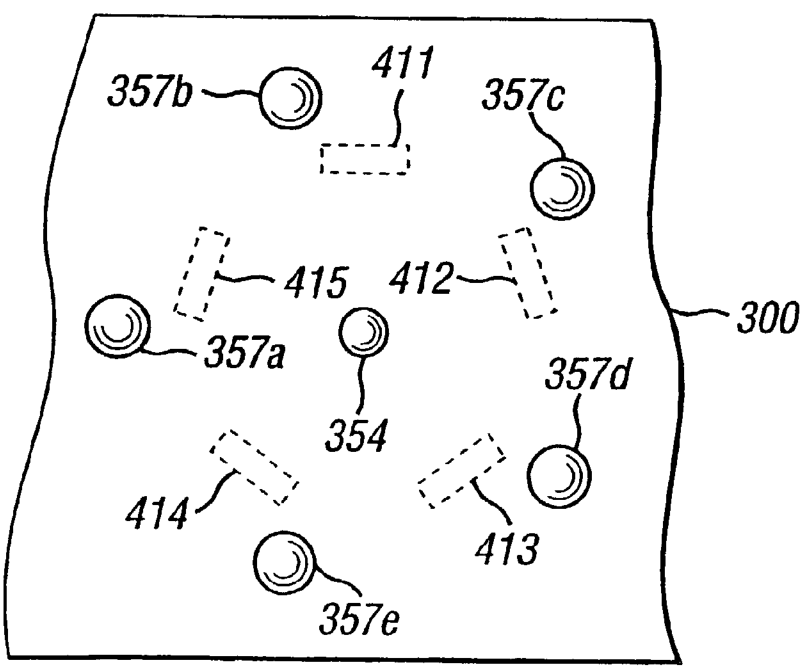
FIG. 6*b* is a plan view of the surface of the fascia plate of FIG. 2*d* in the region of the knob illustrated in FIG. 6*a*, with the knob removed to show equally spaced protrusions which cooperate with corresponding indentations formed within the knob of FIG. 6*a;*

FIG. 6*a* is a cross-sectional view through the temperature control temperature control knob 350 and the surface of the fascia plate 300 on which the temperature control temperature control knob 350 is mounted. As shown, the temperature control temperature control knob 350 has a recess 355 having a narrow throat portion 355*a* formed therein which is adapted to receive the head 354*a* of a peg 354 which is resiliently biased downwardly by means of a spring 353 which is attached between the peg 345 and an inner peg 352 which is formed integrally with the fascia plate 300. This arrangement ensures that the temperature control temperature control knob 350 may be removably attached to the fascia plate 300 and is resiliently biased downwardly against the face of the fascia plate 300 when in its attached position. The temperature control temperature control knob 350 also includes five evenly spaced radial indentations 356*a*–356*e* (shown in FIG. 6*b*) which co-operate with five corresponding protrusions 357*a*–357*e* integrally formed on the surface of the fascia plate 300 such that as the temperature control temperature control knob 350 is rotated around the central axis defined by the peg 354, the temperature control temperature control knob 350 clicks into place at each of the five correct orientations of the knob where one (and only one) of the five reed switches 411–415 will be turned on by the bar magnet 351 mounted within the temperature control temperature control knob 350.

Figure 7:
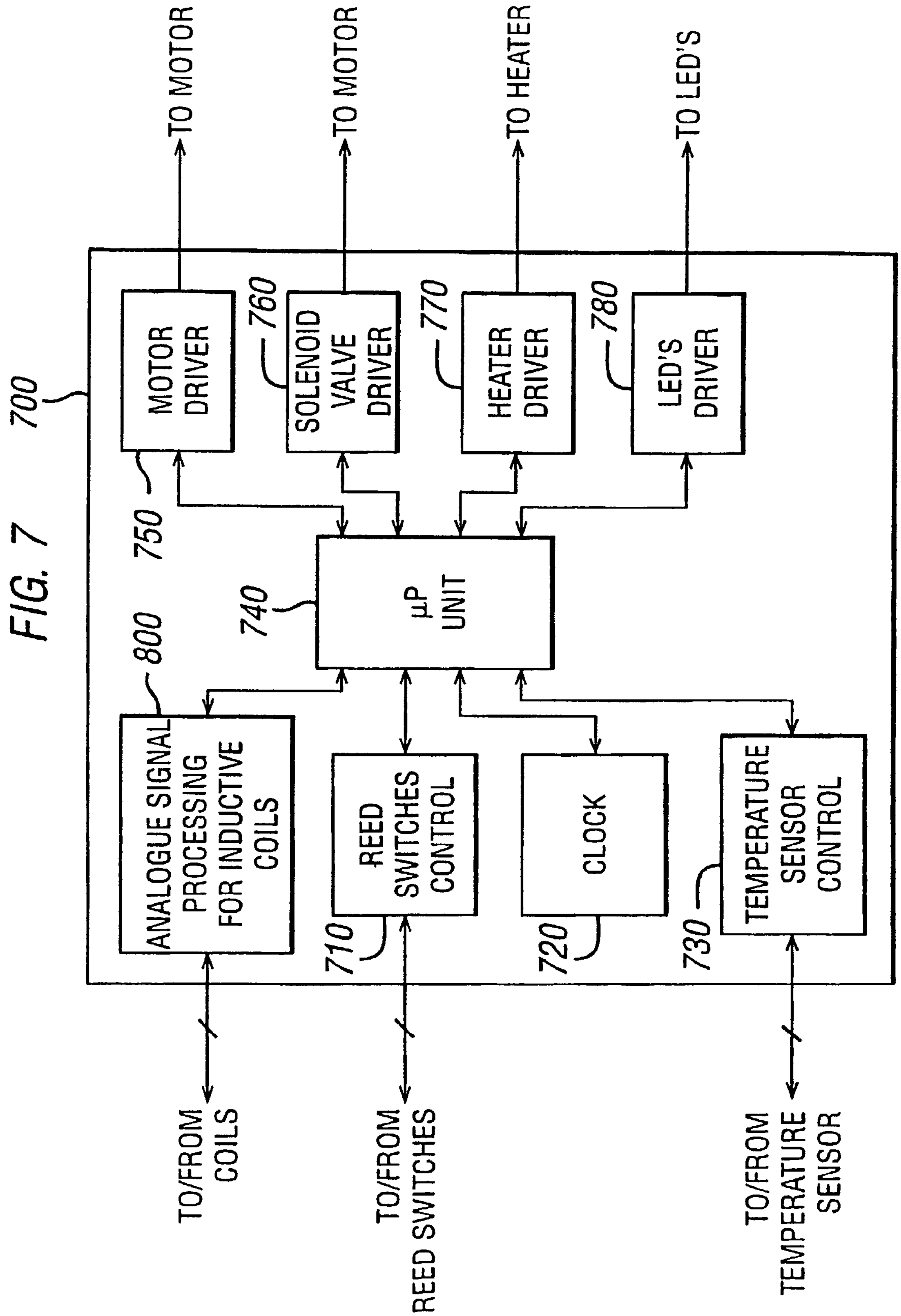
FIG. 7 is a schematic block diagram of the control unit of FIG. 3.

FIG. 7 is a block diagram showing more detail of the control unit 700. As shown, the control unit 700 includes an analogue signal processing for inductive coils block 800 which generates the necessary excitation signals for applying to the excitor coils and processes the signals received from the sensor coils to generate corresponding digital signals which are passed to a microprocessor unit 740. This information is used by the microprocessor unit 740 to determine the position and/or orientation of the pucks in range of the respective sensing coils. The construction of the analogue processing for inductive coils block 800 used in this embodiment is described in greater detail below with reference to FIG. 8. Note that most of the functionality of the control unit 700 can be formed using a single ASIC with associated discrete components all mounted on the opposite side of the PCB 400 to the sensing coils.

The control unit 700 also includes a reed switches control block 710 which monitors the status of each of the reed switches 411–415 to determine if they are on or off and communicates this information to the microprocessor unit 740. This information is used by the microprocessor unit 740 to determine the orientation of the temperature control knob 350, and hence the user set temperature for the wash programme.

The control unit 700 also includes a clock 720 which keeps track of the current time and day and communicates this time information to the microprocessor unit 740. This information is used by the microprocessor unit 740 to control when a wash programme, which a user has set to commence at some future time, is commenced.

The control unit 700 also includes a temperature sensing control block 730 which receives signals from a temperature sensor which monitors the temperature of water in the drum 14, and converts these into digital signals which are passed to the microprocessor unit 740 to inform the microprocessor unit 740 of the temperature of the water within the drum 14.

The microprocessor unit 740 includes a microprocessor and volatile and non-volatile memory (not shown). A controlling computer programme is stored within the non-volatile memory and controls the operation of the washing machine 1. The structure of this control programme is described in greater detail below with reference to FIG. 9. In accordance with the controlling programme, the microprocessor unit 740 receives information about the state of various aspects of the machine 1 via the above described blocks 800, 710, 720, 730, processes this information and generates output controlling signals to four device drivers: a motor driver 750, a solenoid valve driver 760, a heater driver 770 and an LEDs driver 780, which also form part of the control unit 700.

The motor driver 750 generates driving signals in response to the controlling signals received from the microprocessor unit 740 which control the rotation of the motor which drives the drum 14. The motor may be driven forwards and backwards at speeds of up to 1500 rpm by the motor driver 750.

The solenoid valve driver 760 generates driving signals in response to the control signals received from the microprocessor unit 740 which cause the solenoid valves to open and close at appropriate times to permit water to flow into the drum 14, through the soap drawer 16 and out through a waste water outlet.

The heater driver 770 generates driving signals in response to the control signals received from the microprocessor unit 740 which control a heater which controllably heats up the water within the drum to a temperature specified by the microprocessor in accordance with the controlling computer programme. In this embodiment, the heater is able to heat the water up to 100 degrees Centigrade.

The LEDs driver 780 generates driving signals in response to the control signals received from the microprocessor unit 740 which drive the LEDs 401–409.

Figure 8:
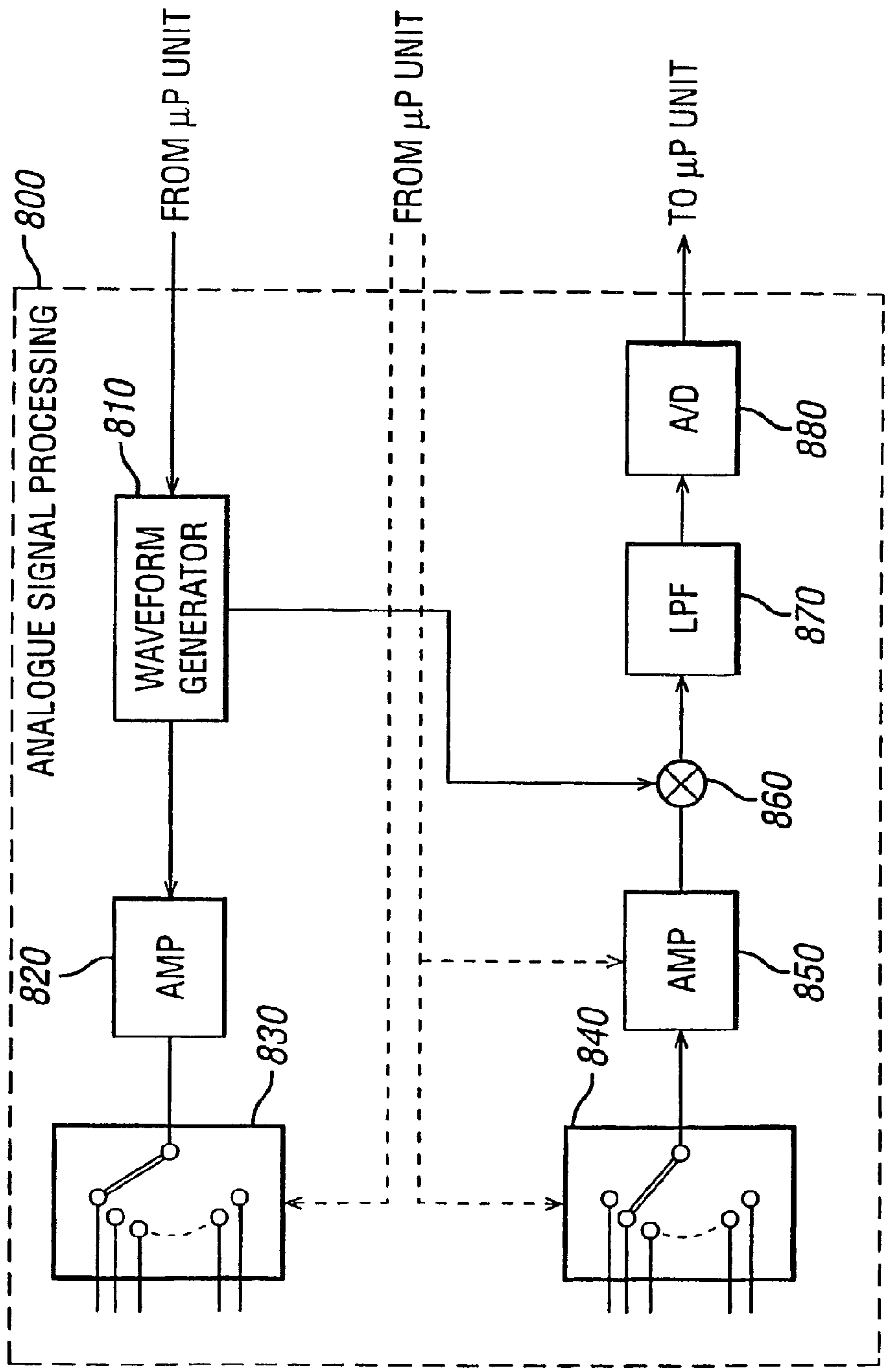
FIG. 8 is a schematic block diagram of an analogue signal processing block forming part of the control unit of FIG. 7.

FIG. 8 is a block diagram of the analogue signal processing for inductive coils block 800. As shown, the block 800 includes a wave-form generator 810 which generates a square-wave voltage signal at a frequency specified by the microprocessor unit 740. The generated square-wave voltage signal is passed to a first amplifier 820 which amplifies the signal and applies it to a first multiplexor 830 which connects the output from the amplifier 820 to an excitor coil as specified by the microprocessor unit 740. The first multiplexor 830 is also able to disconnect the output from the first amplifier 820 from all of the excitor coils under control of the microprocessor unit 740.

The analogue signal processing for inductive coils block 800 also includes a second multiplexor 840 which is controlled by the microprocessor unit 740 to connect a specified one of the sensor coils to a second amplifier 850 which amplifies any voltage signal induced in the connected sensor coil. The amplified voltage signal from the second amplifier 850 is passed to a mixer 860 where the received signal is mixed with an appropriately phase shifted version of the square wave voltage signal generated by the waveform generator 810. If a voltage signal at the same frequency as that of the square wave signal generated by the waveform generator 810 is received from the connected sensor coil, then the output from the mixer will include a dc component whose magnitude varies with the position and/or orientation of the puck to be detected, and higher order frequency components. The output from the mixer is then passed to a low-pass filter 870 which removes the unwanted high frequency components output by the mixer 860 to recover the dc component. The dc component is then converted from an analogue voltage value to a digital value using an analogue to digital converter 880 which is then passed to the microprocessor unit 740 for processing. For further details about the operation of the analogue signal processing for inductive coils block 800, the reader is referred to WO98/58237 discussed above.

FIG. 9 is a table illustrating the parameters, the values of which the microprocessor unit determines from the MMI 100, which are used to determine the details of the particular washing programme specified by the user. One such parameter is a left-panel-identifier as shown in the left column of the first row of the table in FIG. 9. As shown in the middle column, this parameter can take any one of four possible values 0, 1, 2 or 3 and indicates which (if any) left panel 210, 230, 250 is in its operative position (ie lying in registry with the fascia plate 300 with its front surface facing the user without being obscured by another left panel covering it). To determine the value of this parameter, the control unit 700 attempts to detect the presence and position (along the y-axis only in the present embodiment), using the A x-y tablet 430, of a panel identifier puck having a resonant frequency of $f_1$ (which is the resonant frequency of the first left panel 210 embedded panel identifier puck 212). The control unit then looks for a panel identifier puck having a resonant frequency of $f_2$ (which is the resonant frequency of the second left panel 230 embedded panel identifier puck 232). The control unit 700 then looks for a panel identifier puck having a resonant frequency of $f_3$ (which is the resonant frequency of the third left panel 250 embedded panel identifier 252). If the control unit 700 establishes that a panel identifier puck having a resonant frequency of $f_1$ is present with a y position of less than 2 units (in the present embodiment, each tablet 430, 440, 450 is arbitrarily set as being ten units wide by ten units high and the microprocessor 740 determines the position of a detected puck to within a tenth of a unit), then the left-panel-identifier parameter is set to the value 1 to indicate that the first panel is in its operative position. If no panel identifier puck having a resonant frequency of $f_1$ and a y position of less than two units is found, then it is checked whether a panel identifier puck having a resonant frequency of $f_2$ and a y position of less than 2 units is found. If it is, then the left panel identifier parameter is set to the value 2 to indicate that the second left panel 230 is in its operative position. If it is not, then the control unit 700 checks whether a panel identifier puck having a resonant frequency of $f_3$ and a y position of less than 2 units is detected. If it is, then the left panel identifier parameter is set to 3 to indicate that the third panel is in its operative position, otherwise it is set to 0 to indicate that no left panels are in their operative position.

A knob position parameter is shown in the second row of the table of FIG. 9. As shown in the second column of the second row, this can take any one of five different values 0, 1, 2, 3 or 4. If only a single reed switch is on, then the value is set using a look-up table which correlates each reed switch 411–415 to a respective different one of the five different values which the knob position parameter can take. If no reed switch is on or if two or more reed switches are on, it is assumed that the temperature control temperature control knob 350 is not in an allowable position and the knob position parameter is set to the default value of 0 (which corresponds to the temperature control temperature control knob 350 being in its first upwardly pointing off position).

The operator identifier parameter is shown in the third row of the table of FIG. 9. As shown in the second column, in the present embodiment this may take any one of eleven different values, which correspond to no user ID present and ten different possible user ID pucks. To set the value of the operator identifier parameter, the control unit checks to see if any three resonators each having a resonant frequency of one of $f_{16}$, $f_{17}$, $f_{18}$, $f_{19}$ or $f_{20}$ is located with an x position of greater than or equal to 6 units and a y position of greater than or equal to 6 units using the A x-y tablet 430. If three such targets are detected, their relative positions are checked with those of ten different possible configurations which are stored in a lookup table and if a match is found, then the corresponding value for the operator-identifier parameter is retrieved from the lookup table.

The right panel identifier parameter which is shown in the fourth row of the table of FIG. 9 is used to identify which right panel 220, 240, 260 is in its operative position. The value of this parameter is set in a similar way to that of the left panel identifier parameter except that the panel identifier pucks are searched for using the C x-y tablet 450 with an x position of less than or equal to 5 units and a y position of less than or equal to 2 units.

The fifth row of the table of FIG. 9 contains a set of positional parameters indicating the position of each of the twelve pucks 221*a*, 222*a*, 223*a*, 241*a*, 241*b*, 241*c*, 241*d*, 241*e*, 261*a*, 261*b*, 262, 263 which may be located in registry with, and therefore detected by, the B x-y tablet 440. Each of these pucks contains a resonator having a different one of the resonant frequencies $f_1$–$f_{12}$. Each parameter indicates whether the resonator has been detected and if so what position it is at. These positional parameters are then converted by the control unit 700 into higher level control parameters specifying the duration of each sub-programme indicated on the wash programme control panel 220, the duration and speed of rotation of each spin sub-cycle indicated on the spin control panel 240 and the time shown on the timer panel 260.

The sixth row of the table of FIG. 9 shows right panel additional switches parameters. These relate to the six switches 226, 227, 246, 247, 266, 267 each of which contains a puck containing a single resonator having a respective different one of the resonant frequencies $f_4$–$f_9$. Each parameter specifies the position of the switch. The values of these parameters are stored in non-volatile memory such that if a puck corresponding to one of these switches cannot be detected, the parameter keeps the same value as it was given the last time the puck was detected. If a corresponding puck to one of the switches is detected, the position of the puck is used to establish the position of the switch and the parameter is set to this established position.

The seventh row illustrates a fascia-identifier panel parameter. In the present embodiment, this can take any one of 101 possible different values to allow up to 100 different fascia plates 300 to be recognised by the control unit 700 (one default value indicates that no recognised fascia plate 300 is fitted). This parameter is set in a similar way to the operator identifier parameter except that the C x-y tablet 460 is used and the lookup table of possible relative positions of detected resonators is much greater.

The last row of the table of FIG. 9 contains fascia-switch parameters. These specify the states of the push button switches 320, 330. The on/off button 320 contains a puck having a resonator with a resonant frequency of $f_{10}$ and the open door button 330 contains a puck with a resonator having a resonant frequency of $f_{11}$. If either of these pucks is detected in registry with the C x-y tablet 450, then the corresponding parameter is set to 1 to indicate that the switch is on, otherwise it is set to 0 to indicate that it is off.

In the present embodiment, the control unit 700 also checks to see if the drum door 12 and soap drawer 16 are open and sets the values of corresponding parameters appropriately.

Further parameters indicating the temperature of the water within the drum 12, the speed of rotation of the drum, the weight of the drum, the level of water within the drum, the amplitude and frequency of vibration of the drum, the speed of the motor, etc are also set. However, in the present embodiment, the interface parameters contained in the table shown in FIG. 9 (plus the parameters indicating whether the drum door and soap drawer are open and a parameter indicating the mass of the drum) are updated regularly before a washing programme is commenced, and then not at all while a washing programme is being executed. Conversely, the parameters indicating the state of the machine (in particular the ones requiring frequent sampling of the position of a puck such as the speed of rotation of the motor shaft and drum shaft and the amplitude and frequency of vibration) are not updated at all unless a washing programme is being executed whereupon they are updated regularly.

As will be apparent from the above discussion, in order to update the values of the interface parameters, it is necessary to perform regular determinations of the positions of various pucks. As noted above, a single such determination can be made at a frequency of greater than 2 kHz. In the present embodiment, to update all of the interface parameters takes approximately 35 determinations which means that a complete update of all of the parameters can be performed at a rate in excess of 50 Hz. In the present embodiment, while the machine detects variations in the interface parameters, it continually scans through making all determinations to continually update all of the interface parameters. As noted above, this can be done in excess of 50 Hz which is sufficiently frequent to appear to be instantaneous as far as the user is concerned. If, while the machine 1 is not executing a washing programme, no change in an interface parameter is detected for more than 2 minutes, the machine enters a sleep mode in which each interface parameter is updated only once every few seconds. When a change in position of a detected puck is noted, the machine 1 "wakes up" and commences scanning through updating all of the interface parameters continuously.

In the present embodiment, the overall architecture for the controlling software is that the various parameters (i.e. the interface parameters and the parameters indicating the internal state of the machine) are updated in the manner described above and the values held by these parameters are accessible to the main controlling computer programme which controls the overall operation of the washing machine 1.

Figure 10:
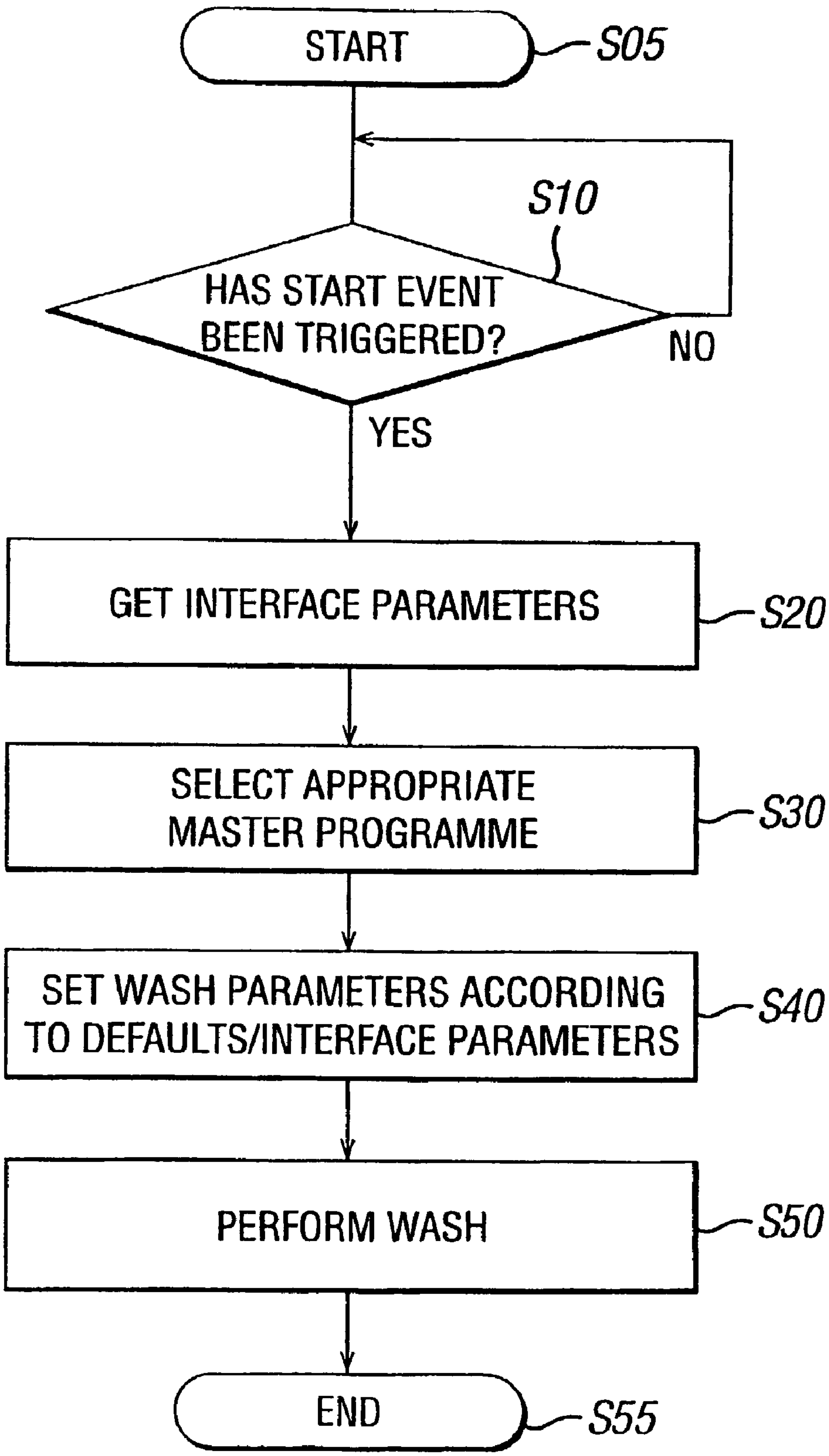
FIG. 10 is a flow chart illustrating how the appliance of FIG. 1 controls a washing programme in dependence on any parameters input by a user using the man-machine interface of the appliance of FIG. 1.

FIG. 10 is a flow chart illustrating the overall structure of the main controlling computer programme. Upon commencing the method at start step S05, the control moves to step S10 where the control unit 700 determines if a start event has been triggered. A start event will be triggered when all of the following events have occurred: one of the left panels is in its operative position with the temperature control knob 350 in a position selecting a temperature rather than being in the off position; the on/off button 320 is in the on position; and the soap drawer 16 and the drum door 12 are closed. When a start event has been triggered, control passes from step S10 to step S20 otherwise it circles back to step S10 until a start event has been triggered. At step S20, the control programme accesses all of the latest values of the interface parameters (and additionally the weight of the drum parameter). Control then passes to step S30 where the control programme selects an appropriate master washing programme on the basis of the interface parameters. In particular, in the present embodiment, the washing machine 1 includes three basic master washing programmes corresponding to a woolen master washing programme, a cotton master washing programme and a synthetic master washing programme. The appropriate master washing programme is therefore selected on the basis of the left panel identifier parameter. Upon completion of step S30, control passes to step S40 in which the various parameters whose values may be changed to modify the master washing programme are set in accordance with the interface parameters and the amount of water to be used is set in accordance with the weight of the drum parameter. Where the user has not opted to exercise specific control over certain parameters but instead has requested the washing machine 1 to select these itself according to default settings by switching off the appropriate right panel, then pre-stored default values for these parameters will be used instead. Upon completion of step S40, control passes to step S50 in which the washing programme is carried out on the basis of the master washing programme selected in step S30 whose modifiable parameters were set in step S40. Upon completion of step S50, the method ends at end step S55. Upon completion of this method, the machine 1 returns to a standby state and waits a user to press the open door button to allow the drum door to be opened and the washed clothes to be removed.

Second Embodiment

The above described first embodiment may be modified to include functionality for permitting radio frequency identification (RFID) transponders to communicate data to the washing machine 1. Such transponders may then be fitted to newly purchased garments with information which can be used to determine which master washing programme should be selected and also to set the various variable parameters within the master washing programme to customise the washing programme exactly for the garment. The user may then pass the transponder within sensing range of the facia plate 300 and the MMI 100 (which continually monitors for an RFID transponder within range) will initiate the RFID transponder into transmitting its stored data which the MMI 100 will receive and use to configure the washing programme accordingly.

Figure 11A:
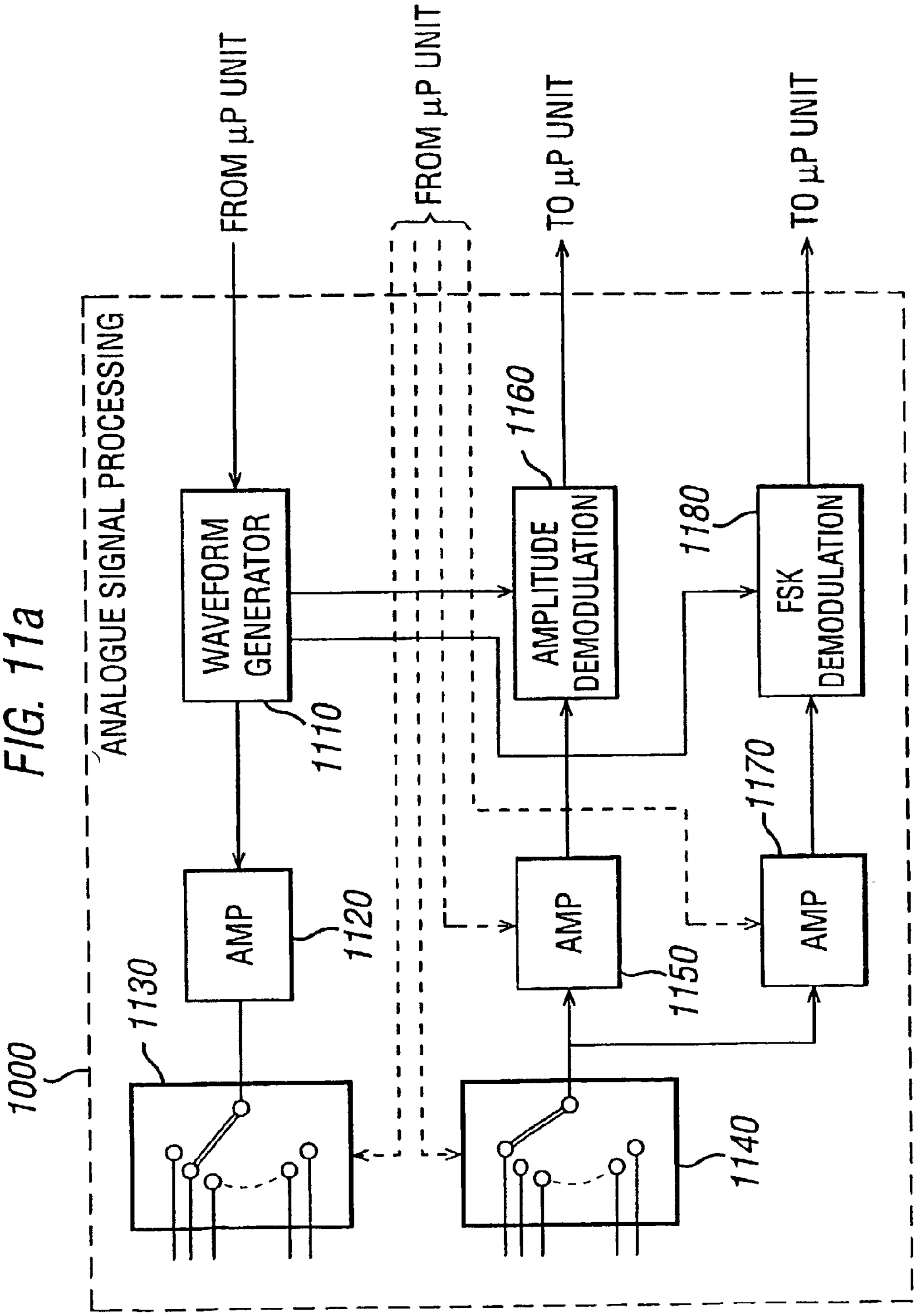
FIG. 11 a is a schematic block diagram of a modified analogue signal processing block forming part of an otherwise similar control unit of a washing machine incorporating a man-machine interface according to a second embodiment which is able to receive data signals transmitted from passive RFID transponders.
FIG. 11*b* is a schematic block diagram of a passive RFID transponder for use with an appliance including a man-machine interface according to the second embodiment.

FIG. 11*a* is a schematic block diagram of a modified analogue signal processing for inductive coils including RFID functionality block 1100 which replaces analogue signal processing for inductive coils block 800 in the control unit 700 as shown in FIG. 7. As shown, the modified analogue signal processing block 1100 includes a wave-form generator 1110 which is similar to the wave-form generator 810 shown in FIG. 8 and, as before, generates square-wave driving voltage signals are passed to a first amplifier 1120 which is again similar to the first amplifier 820 shown in FIG. 8. The amplified driving voltage signal output from the first amplifier 1120 is passed onto a first multiplexer 1130 which is similar to the first multiplexer 830 of FIG. 8. Thus the transmit path of the modified analogue signal processing block 1100 is substantially unchanged from that of the analogue signal processing block 800 shown in FIG. 8.

Along the receive path however, two separate receive channels are provided after a second multiplexer 1140. The first channel includes a second amplifier 1150; and an amplitude demodulation block 1160. These items essentially correspond to the second amplifier 850, the mixer 860, the low pass filter 870 and the analogue digital converter 880 of the analogue signal processing block 800 shown in FIG. 8. However, the second receive channel comprises a third amplifier 1170 and a frequency shift keying (FSK) demodulation block 1180. Whether or not the second or third amplifier is switched on is controlled by the microprocessor unit 740. Most of the time, the third amplifier 1170 is switched off and the modified analogue signal processing block 1100 operates in substantially the same way as the analogue signal processing block 800 of the first embodiment. However, when an RFID transponder has been detected by sensing the presence of a puck having the resonant frequency allocated to RFID transponders using the first receive channel, the second amplifier 1150 is switched off and the third amplifier 1170 is switched on and the signals received from the receiving sensor coil are amplified by the third amplifier 1170 and then passed onto the FSK demodulation block 1180 where the received signals are demodulated to recover the data transmitted by the RFID transponder.

Figure 11B:
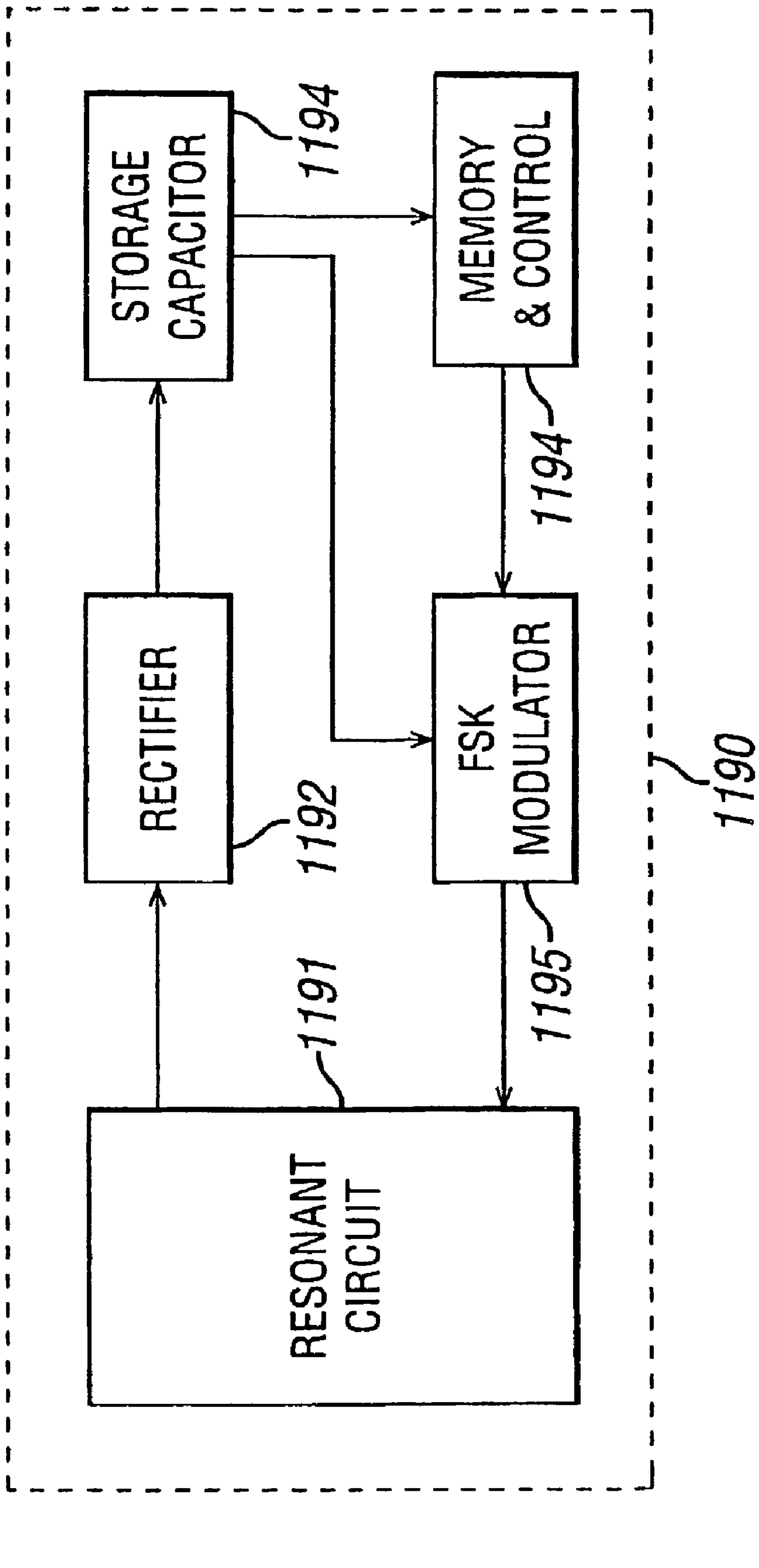

FIG. 11*b* is a schematic block diagram of an RFID transponder 1190 suitable for use with the present embodiment. As shown, the RFID transponder 1190 includes a resonant circuit 1191 having a predetermined resonant frequency which is known to the washing machine 1. As noted above, the washing machine 1 will periodically search for a transponder by attempting to detect the presence of the resonant circuit 1191 having the predetermined frequency assigned to RFID transponders which are mounted by clothes manufacturers in new garments. The RFID transponder 1190 also includes a rectifier block 1192 which rectifies an induced alternating voltage signal generated by the resonant circuit by the MMI 100. The rectified voltage is then applied to a storage capacity 1193 which provides power to the remaining elements of the RFID transponder 1190 which are a memory and control block 1194 and an FSK modulator 1195. Once the storage capacitor 1193 has stored sufficient energy to power the memory and control block 1194 and the FSK modulator 1195 for a sufficient length of time to permit them to transmit a message stored in the memory and control block 1194, the message from the memory and control block 1194 is read out to the FSK modulator block 1195 which modulates a carrier signal at the resonant frequency by the data forming the message to be transmitted and transmits the modulated carrier signal via the resonant circuit 1191 to the MMI 100. In practice, the RFID transponder 1190 may be formed by combining a simple resonant circuit such as that described above with reference to FIG. 4*f* or FIG. 5D together with an RFID transponder chip such as the transponder chips produced by Innovision Limited under the module number RLU-W1.1 and as described in PCT patent application WO98/24527, hereby incorporated by reference.

For further details about the operation of RFID transponders and receivers, the reader is referred to the RFID Handbook written by Klaus Finkenzeller published by Wiley having ISBN number 0-471-98851-0, hereby incorporated by reference.

In this embodiment, the user identifier pucks are also replaced with RFID transponders. This enables the security to be greatly enhanced since the RFID transponder is able to store a relatively large identification or serial number in its memory (for example, a number of several thousand bytes in length). Similarly, the fascia plate identifier puck is also replaced with an RFID transponder. Furthermore, in the present embodiment, the fascia plate identifier RFID transponder includes data specifying what buttons it includes to permit each fascia plate to be self configuring (ie when a new fascia plate is mounted onto the appliance, the control unit receives the data output from the fascia plate identifier RFID transponder and generates a corresponding internal map of the positions and orientations of detected pucks to control parameters controlling the selection and modification of washing programmes, etc.). A similar panel book identifier RFID transponder can be included in the book panels to be fitted over the fascia plate 300 to permit the books 200 to be self configuring as well. Care must be taken where more than one RFID transponder will be in range of a particular sensor coil at the same time during normal operation of the appliance to ensure that they do not transmit at the same time. In the present embodiment, this is done by ensuring that book RFID transponders have a different predetermined resonant frequency to either transponders fitted to clothing garments or transponders identifying the fascia plate 300.

Third Embodiment

Figure 12A:
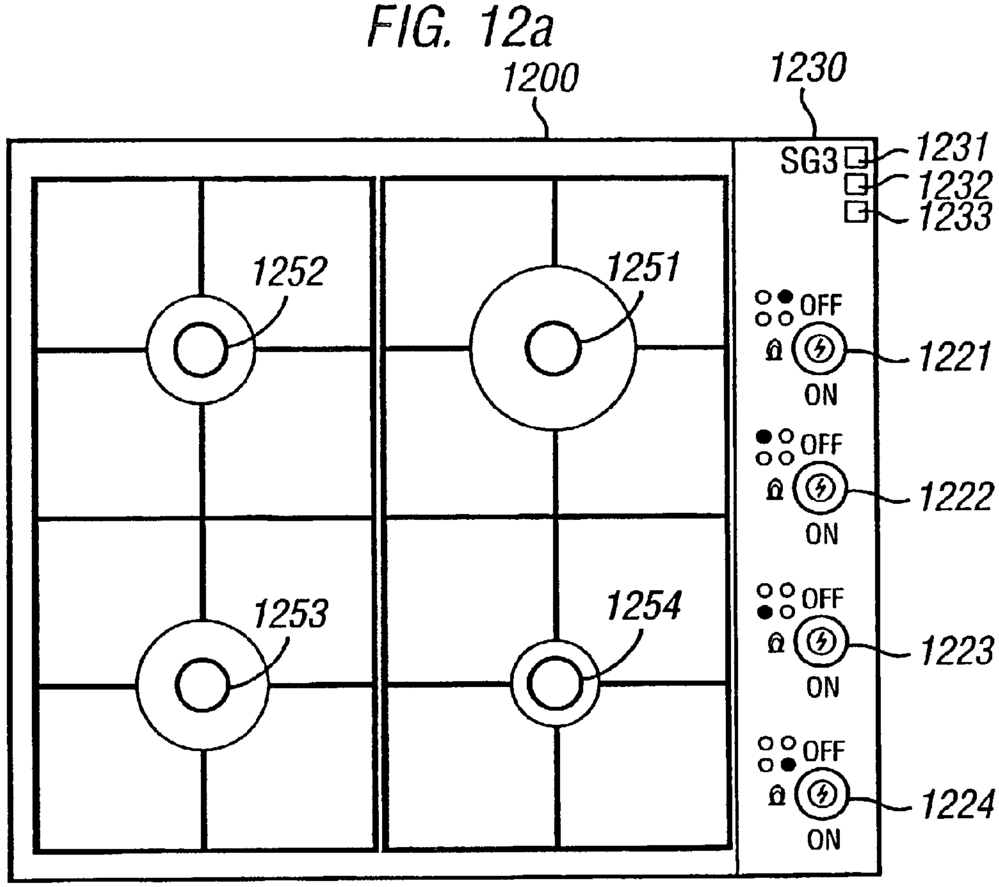
FIG. 12*a* is a plan view of a gas-stove having a man-machine interface according to a third embodiment.

FIG. 12*a* is a schematic plan view of a stove 1200 which has a fascia plate 1230 removably affixed thereto. The fascia plate 1230 includes fascia plate identifying pucks 1231, 1232, 1233 each of which includes a resonant circuit having a specified resonant frequency such that the combination of pucks 1231, 1232, 1233 and their relative positions are used to identify the fascia plate 1230 attached to the stove 1200. Removably mounted on the fascia plate 1230 are four gas control buttons 1221 to 1224 which are used both to generate a spark to ignite a corresponding gas ring 1251 to 1254 and to control the amount of gas emitted from each of the rings 1251 to 1254 (so as to control the heat generated by each of the gas rings 1251 to 1254).

Figure 12B:
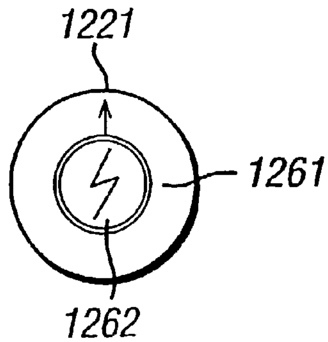
FIG. 12*b* is an expanded plan view of one of the knobs of the man-machine interface of the gas-stove of FIG. 12*a;*

FIG. 12*b* is an expanded plan view of the first button 1221. As shown, it comprises an outer ring 1261 for controlling the amount of gas flowing from the corresponding gas ring 1251 and an inner button 1262 which causes a spark at gas ring 1251 when it is pressed down by a user.

Figure 12C:
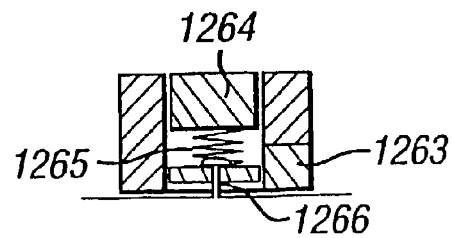
FIG. 12*c* is a cross-sectional side view through the knob of FIG. 12*b;*

FIG. 12*c* is a cross-sectional view through the control button 1221. As shown, the outer ring 1261 includes a first resonant circuit 1263 mounted in one portion thereof and the position of this resonant circuit 1263 is remotely sensed in order to determine the orientation of the ring 1261 and hence how much gas should be emitted from the corresponding gas ring 1251. The inner button 1262 includes a second resonant circuit 1264 having a different resonant frequency to that of the first resonant circuit 1263 mounted in the ring portion 1261. As shown, the second resonant circuit 1264 in the inner button 1262 is biased upwardly by a spring 1265 which may be removably connected to a peg 1266 formed integrally with the fascia plate 1230. Upon pressing the inner button 1262 against the force of the spring 1265, the second resonant circuit 1264 is pushed downwards towards the fascia plate 1230 and this movement causes the second resonant circuit 1264 to come into range of sensor coils located within the stove 1200 to permit the presence of the second resonant circuit 1264 to be detected. Upon detection of the second resonant circuit 1264, the stove 1200 causes a spark at the corresponding gas ring 1251 which will cause any gas flowing through the gas ring 1251 to ignite. The other three control buttons 1222 to 1224 are substantially the same as the first control button 1221 except that all of the resonant circuits have different resonant frequencies so that they may all be detected using the same sensing coils. In the present embodiment, the user may remove the control buttons 1221 to 1224 for cleaning or safety reasons. When the control buttons are removed, the stove goes into a safe mode in which no gas is permitted to flow. When the user replaces buttons, any button may be fitted on any peg 1266 thus, in the present embodiment, the stove determines which ring to control in dependence upon the position of the detected pucks in each button rather than the associated resonant frequency of the pucks within the buttons.

Fourth Embodiment

Figure 13A:
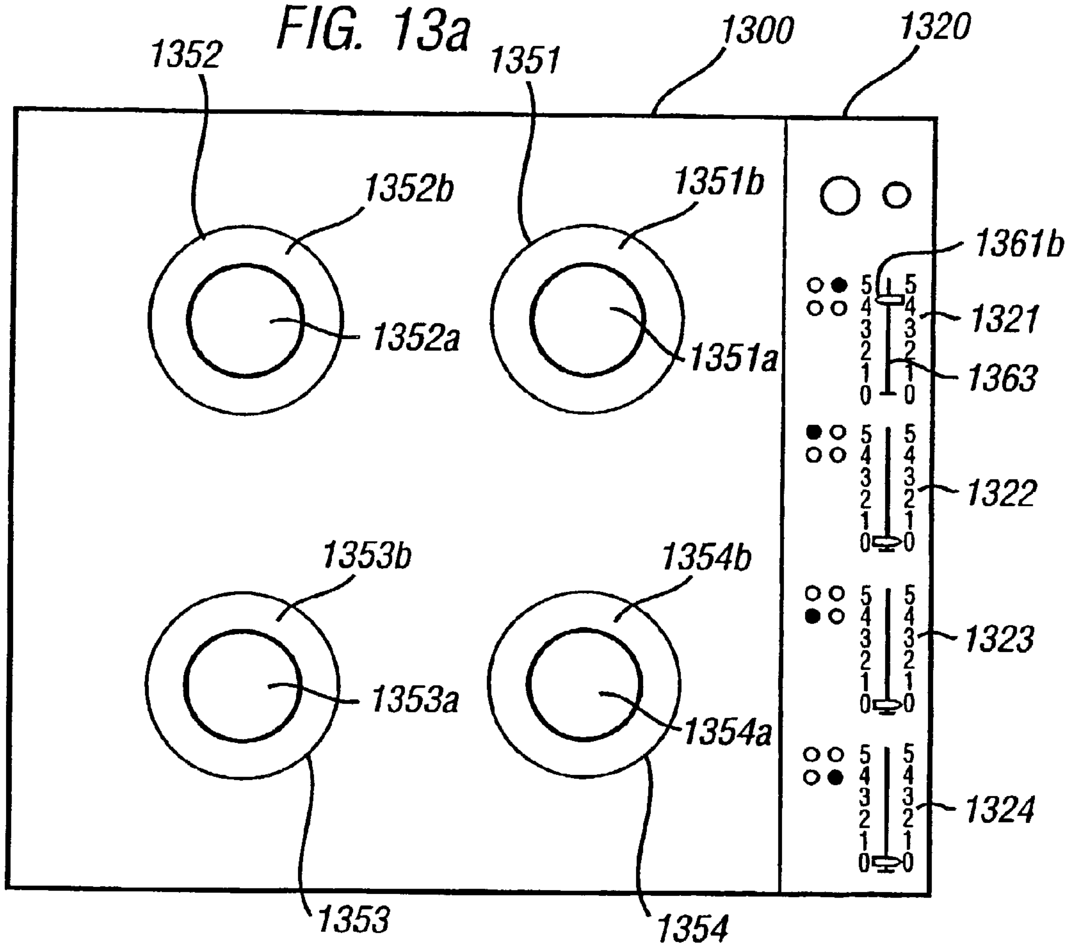
FIG. 13*a* is a plan view of a ceramic-stove including a man-machine interface according to a fourth embodiment of the present invention.

FIG. 13*a* is a schematic plan view of a ceramic stove 1300 according to a fourth embodiment. As shown, the stove 1300 includes a fascia plate 1320 which is removably affixed to the right-hand side of the stove 1300. In this embodiment, the fascia plate 1320 includes an RFID transponder which can be read by the stove 1300 to identify the fascia plate 1320 and to establish the nature of its controls. In this embodiment, the controls of the fascia plate 1320 are four slider bars 1321 to 1324, each of which corresponds to a corresponding ceramic heating element 1351 to 1354, each of which comprises an inner element 1351*a* to 1354*a* and an outer element 1351*b* to 1354*b*.

Figure 13B:
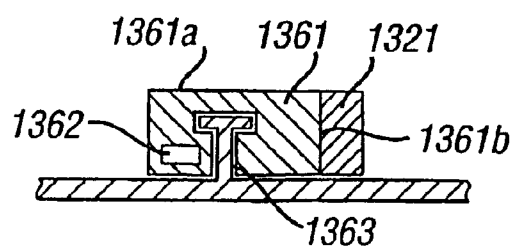
FIG. 13*b* is a cross-sectional view through a slider arrangement forming part of the man-machine interface of the ceramic-stove of FIG. 13*a*.

FIG. 13*b* is a cross sectional view through one 1321 of the slider bars 1321 to 1324. As shown, the slider bar 1321 includes a slidable element 1361 which includes a resonant circuit 1362 located at the back 1361*a* of the slidable element 1361. The front of the slidable element 1361 is formed into a point 1361*b* which may point either to the left or to the right as the slidable element is moved up and down along a rail 1363 formed integrally with the fascia plate 1320. To operate the electric stove 1300, a user mounts one or more of the slidable elements 1361 onto a respective slider bar 1363 by sliding it onto the slider bar 1363 so as to point either to the left to control the amount of heat generated by both the inner and outer elements 1351*a* and 1351*b* or pointing to the right so as to control only the inner element 1351*a*. The stove 1300 is able to locate the position of the resonant circuit 1362 and thereby to determine which way the slidable element 1361 is pointing and hence whether to control both corresponding elements 1351*a*, 1351*b* or just the inner element 1351*a* and also to detect how far along in the y direction the puck is located so as to determine at what power the ceramic heating element should be energised.

The four slidable elements for the four slider bars 1321 to 1324 are substantially similar except that they include resonant circuits having different resonant frequencies so that a single sensor coil may detect the position of each target. In the present embodiment, the slidable elements are arranged so that they can be removed when the stove is not on. This provides an intuitive safety mechanism to prevent children etc from inadvertently operating the stove and burning themselves since the slidable elements may be stored in a safe place and only brought out and mounted on the slider bars when required.

Fifth Embodiment

Figure 14:
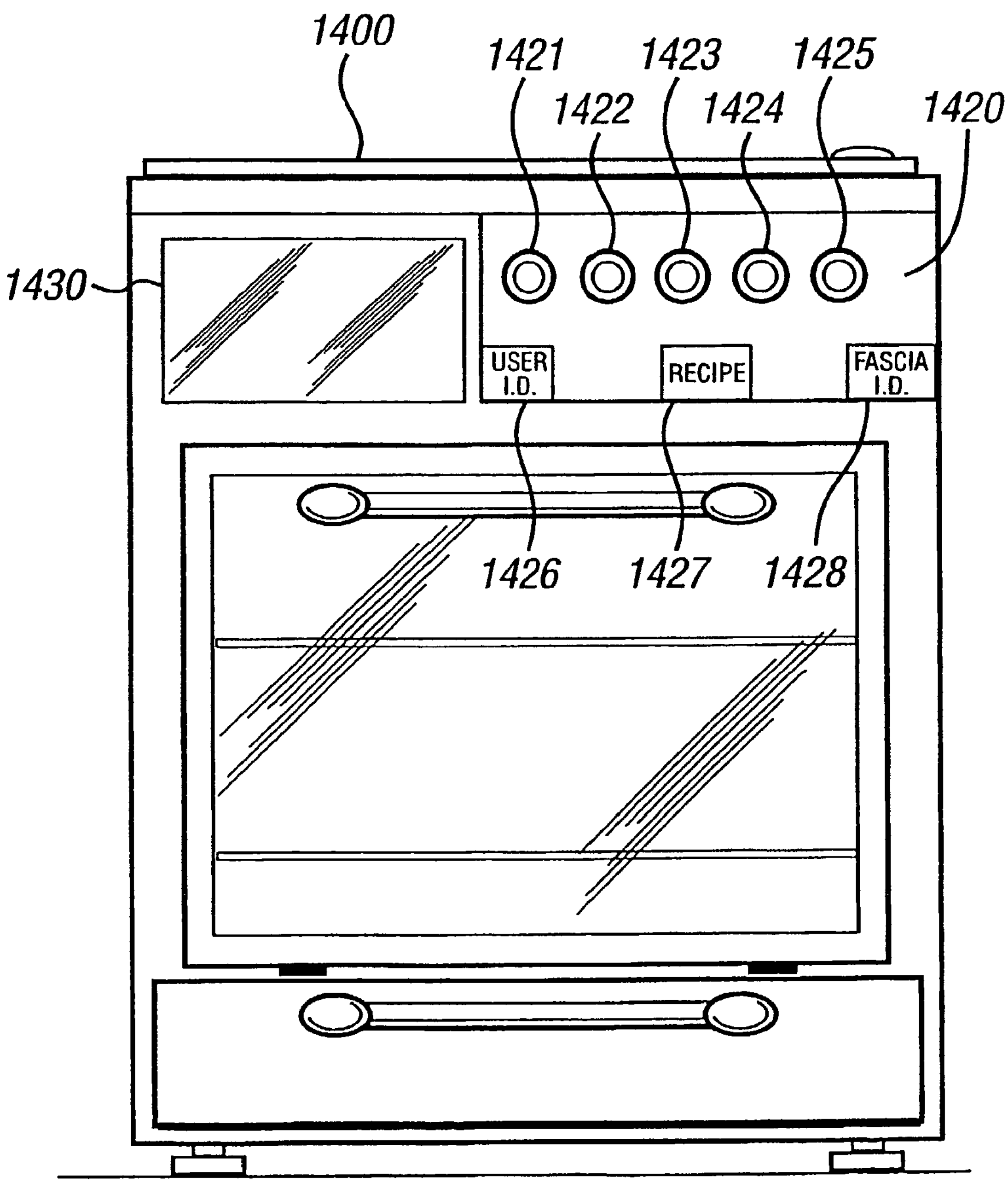
FIG. 14 is a front view of an oven including a man-machine interface according to a fifth embodiment of the present invention.

FIG. 14 is a schematic front view of an oven 1400 according to a fifth embodiment. As shown, the oven includes a liquid crystal display 1430 for displaying text and images to a user and a fascia plate 1420 including five controlling knobs 1421 to 1425 each of which includes a resonant circuit whose position may be remotely sensed by the oven 1400. The fascia plate 1420 also includes a fascia ID embedded transponder 1428 which can communicate data to the oven 1400 informing the oven about the layout of the fascia plate 1420. The fascia plate 1420 also includes a marked region 1426 for receiving a user ID puck. Each such user ID puck contains a transponder and a serial number identifying the user. The transponder within each user ID puck has a different resonant frequency to the embedded fascia ID transponder 1428. The fascia plate 1420 also includes a designated area 1427 for receiving recipe pucks. A recipe puck includes a transponder having a different resonant frequency to that of either the user ID puck or the embedded fascia ID transponder 1428. The recipe pucks may be attached to magazines etc and can include text which may be displayed on the LCD screen 1430 as well as including parameters used for controlling the operation of the oven 1400 according to a specified temperature versus time profile etc. The designated area 1427 for receiving recipe pucks may also receive simple combination pucks having a specified combination of resonant circuits with different resonant frequencies in a predetermined relative position to one another within the puck and such pucks can be used to record a particular time temperature profile and to replay this time temperature profile whenever the corresponding combination puck is affixed to the designating recipe receiving area 1427.

Variations

The above described embodiments illustrate the application of a man-machine interface including user actuable elements such as knobs and buttons which include resonant circuits or other elements which can be remotely sensed and discusses the application of these man-machine interfaces to three different types of domestic appliance, namely a washing machine, a stove and an oven. However, similar interfaces may be used in wide variety of domestic appliances such as, for example, central heating controllers, security systems, access control systems, lighting control systems, freezers, chillers, air handling units, video cassette recorders, thermostats, dryers, food processors, etc. Furthermore, similar interfaces may also be applied to non-domestic systems such as ticketing machines, photocopies, burners, boilers, compressors, submersible pumps, medical infusion pumps, energy diagnostic systems, statistical process control systems, musical instruments, audio mixing desks, medical equipment, fluid control valves, marine devices, etc.

In the first embodiment described above, pucks including resonant circuits are detected using a pulse echo technique in which the resonators are energised and then the signal from the resonators is detected after the excitation signal has been removed. However, other types of sensing technique may be used such as, for example, a continuous excitation technique in which the signals from the resonators are detected at the same time as the excitation signal is applied to the excitation coil.

The embodiment described above gives an example of the sensing coils being formed on a printed circuit board which is located so as to be in registry with the fascia plate when fitted. However, the sensing coils may be formed using many different techniques such as etching, conductive ink printing or wire bonding, and the sensing coils may be mounted or formed on a number of different surfaces. For example, it may be advantageous in some circumstances to form the coils directly on the reverse side of a fascia plate to be mounted onto an appliance or to form the coils on the inside surface of a sealed box, the corresponding outside surface of which is to have a fascia plate mounted thereon. In such cases, it may be particularly convenient from a manufacturing point of view to print the coils onto such surfaces using layers of conductive and insulating "inks".

The first embodiment described above gives an example of a puck (the user ID puck) which is held in place by means of a magnet and which is removable to enable restrictions on resetting of the washing machine for security, safety, aesthetic and cleaning reasons. As an alternative example, in a safety relevant piece of equipment such as an industrial scale gas burner, only approved technicians may be provided with a set of removable pucks so that only they may programme or configure the equipment. Such configuration may be achieved, for example, using pucks which are inductively or magnetically detectable and are marked so as to represent open or closed relays as used in ladder logical programming of control systems. The first embodiment described above could be modified by including sensing coils and associated puck for monitoring or verifying the position of the solenoid controlled water valves.

A man-machine interface including both remotely sensed user actuable elements and traditional technologies such as liquid crystal displays and switches may be advantageous in certain applications. A conventional mechanical switch may for example be used as an enter data key.

The first embodiment gives an example of a convenient way of programming a time varying profile in the case of the second right panel 240 for controlling how the spin cycle varies over time. A similar interface may be used with many different applications such as, for example, a central heating control system, a home lawn sprinkler control system or a security control system over a 24 hour period.

Other types of remote position sensing could also be used. For example, capacitive sensing could be employed as could optical or acoustic techniques. However, these techniques are generally less preferred because they tend to be more expensive and less robust than simple inductively sensed pucks. In particular, optical techniques require line of sight between a remotely sensed element and a sensing element and this places more constraints on the design of the device. Also, capacitive, ultrasonic and acoustic techniques suffer from the presence of excess moisture or variations in the moisture content of the ambient atmosphere.

Many different types of magnetic effects can be employed to perform the remote sensing function. In particular, Hall effect, magnetoresistive, giant magnetoresistive, colossal magnetoresistive and other solid state contactless magnetic sensing technologies could be employed. As regards inductive sensing of resonators, many different similar techniques are known and commercially available. For example, the following companies all manufacture remote inductive sensing apparatus which could be adapted for use in the present invention: Saitek, Wacom, Kollmorgen, Kanto Seiki.

By including two or more resonators in a known relative position to one another, within a puck, it is possible for the x, y, z and z-rotational positions and orientations of a single puck to be sensed (by z direction is meant the distance perpendicularly away from a sensing surface on which a flat two-dimensional set of windings has been formed as in the x-y tablets described above—as noted above, the z-position can be measured to a certain extent by measuring the strength of a received signal from a single resonator as it comes into range). The way in which these different positions and orientations may be measured is described in WO98/58237 discussed above. By using most or all of these, a single puck may be used to provide a large amount of data input in an intuitive manner.

Because the surface onto which a fascia plate is attached may be fully sealed and enclosed, remote sensing man-machine interfaces such as those described above are particularly useful for underwater, waterproof or extreme temperature applications where traditional keypads displays and cable connectors are problematic. Additionally, problems with traditional technologies for use with MMI's such as potentiometers can be overcome, as can problems arising from temperature changes (since ratiometric readings may be taken). Additionally, using remote sensing of user actuable elements overcomes difficulties associated with conventional user interface technologies which require close tolerance alignment or line of sight connections between the user actuable elements and an electronic component contained within the device.

In the above described embodiments, the fascia plates are removably attached to their respective appliances by means of releasable snap-fit mechanisms. However, other means may be used for removably attaching fascia plates (or user actuable elements) to their respective appliances. For example, magnetic attraction could be used by including permanent magnets either in the appliance or the fascia plate and co-operating ferrite or magnets in the fascia plate or appliance respectively. Alternatively, other releasable mechanisms could be used such as textile hook-and-loop materials, non-setting glues or adhesive putties, nuts and bolts, etc.

The concept of a user ID puck can be applied to many different applications. For example, a domestic hifi system may come with a number of different user ID pucks, one for each member of a family who uses the hifi system. Different control settings of the hifi system may then be stored in correspondence with the different users and the hifi system may automatically adjust its settings whenever a new user ID puck is affixed to the system. If the user ID pucks are carried by each of the users (for instance, on a key ring) then the pucks can also provide some degree of security since the hifi system may be prevented from operating unless a validly recognised user ID puck is supplied. Such functionality would then make it difficult for a thief to steal and then operate the system since he would also need the "key" puck. Such security can be further increased by using more sophisticated RFID transponders which are able to engage in two-way challenge and response encrypted data signal interchanges (for example using private/public key encryption techniques etc.).

Another application of "key" or "ID" pucks is in the control of multiple zones (for example different zones within a building for purposes of a heating, ventilating, air-conditioning (HVAC) or a security system. By designating a different puck for each zone, a single interface can be used for adjusting the controls for each individual zone simply be ensuring that the puck for the correct zone is located on the interface. In the case of a domestic heating system, an automatically controllable radiator which may be remotely controlled using either a wireless signal or a powerline carrier signal transmission using the mains electricity supply within the house, can be separately programmed by providing a designated puck for each such automatically controlled radiator. In this way, a radiator located in a living room may be programmed to not come on in the morning but only to come on in the evening, for example.

Instead of using ID or key pucks, a fascia plate or similar element may be capable of recognition by the appliance to which it is fitted simply by virtue of the positions and/or other detectable characteristics such as resonant frequencies of pucks mounted on the fascia plate as part of user actuable elements such as knobs, sliders, 2D curvilinear markers, buttons, etc mounted on the fascia plate.

An interface having remotely sensed user actuable elements may be particularly useful for controlling a shower. In such a case, it will be possible for the user actuable elements to be mounted on both sides of a sensing surface so that the shower may be controlled either inside the shower cubical or outside the shower cubical. One way of achieving this is to use user actuable elements which are magnetically attached to the sensing surface and which magnetically attract one another so that as one is moved the other moves as well. Complicated shower programmes may be intuitively set and different user ID pucks can be used to remember preferred time temperature profiles.

Similar "recipe" pucks to those described above could also be used to provide preprogrammed time temperature profiles.

In the above described embodiments, each fascia plate includes a fascia plate identification puck which identifies the type of fascia plate attached to the appliance. This permits the functionality of an appliance to be modified or enhanced simply by modifying the fascia plate without having to modify the basic underlying machine. However, instead of including an identification puck, the machine may be able to simply recognise which fascia plate is attached by detecting the position and characteristics of any remotely detectable user actuable elements contained on the fascia plate.

RFID transponders may also be used as a means of enabling relatively sophisticated data to be easily input to the device, for example to update the appliance's control software (e.g. for enhancing its functionality or fixing bugs).

Where a user actuable puck is attached to a sensing surface by means of a magnet, it is possible and advantageous, to include a small magnet within the user actuable element and include a larger piece of ferrite material (which is considerably cheaper than a permanent magnetic) on the other side of the sensing surface, such that a single puck may be magnetically secured to the sensing surface in a number of different positions.

An inductive position sensing technique may be used to measure temperature in adverse conditions by using a bimetallic strip having a resonant circuit affixed to the free end thereof, and whose position may be tracked via a pair of quadrature linear sensor coils. Alternatively some of the above described inductive position sensing techniques for monitoring the interval status of the washing machine of the first embodiment could be replaced with more conventional arrangements. For example, instead of measuring the water level using a floating puck, a sealed pipe could be placed in pressure communication with the water in the drum and a flexible membrane attached to the end of the closed pipe. Movement of the membrane as the pressure changes could be detected either using a remote sensing technique or using a more conventional method such as an attached strain gauge to measure the pressure in the sealed pipe and hence the level of water within the drum.

Other types of resonators could be used to those described above. For example, 45 magnetostrictive resonators could be used. Furthermore, harmonic generators which generate harmonics of the excitation signal could be used (such harmonics are then detected by the MMI). Furthermore, other magnetic field affecting elements could be used such as simple short circuit coils without an associated capacitor but having varying inductances by varying the number of turns; metallic "screens" of various shapes and sizes or permeable elements such as ferrite.

In all of the above mentioned remote sensing techniques, the remotely sensed item may be thought of as generating a signal. Thus even where a simple metal screen is used for detection by the effect it has on a surrounding magnetic field, the screen will generate eddy currents which attempt to resist the change in the surrounding magnetic field, and it is the effect which these eddy currents have which is remotely detected. Similarly, where an object is detected optically or acoustically, it is the reflected energy which is detected and this reflected energy can be thought of as a re-radiated or generated signal.

What is claimed is:

1. A domestic appliance having a man-machine interface for controlling the operation thereof, the man-machine interface comprising:

first and second relatively moveable members;

wherein said second member comprises means for generating a signal;

wherein said first member comprises means for sensing the signal generated by said second member and for outputting a signal which varies dependent upon the relative position of said first and second members;

means for controlling the appliance dependent upon the sensed relative position of said first and second members;

wherein the first member is located within a housing of the appliance and the second member is provided external to said housing and being moveable by a user relative to said housing; and wherein said second member comprises a resonator.

2. An appliance according to claim 1, wherein said signal generating means is passive and wherein said first member comprises means for energising said signal generating means.

3. An appliance according to claim 1, wherein said resonator comprises an electrically resonant circuit.

4. An appliance according to claim 1, wherein said energising means comprises an excitation coil and means for applying an excitation current to the excitation coil for causing the resonator to resonate; and wherein said sensing means comprises at least one sensor coil for sensing the electromagnetic field generated by said resonator.

5. An appliance according to claim 4 wherein the sensing means comprises at least two sensor coils for sensing the electromagnetic field generated by said resonator, whereby the signal generated by one sensor coil may be compared with the signal generated by the other sensor coil to thereby generate the output signal which varies in dependence upon the relative position of said first and second members.

6. An appliance according to claim 1, comprising a plurality of said second members, each operable to generate a respective signal and wherein said sensing means is provided in common to said plurality of second members and is operable to generate a respective output signal for each second member indicative of the relative position of the respective second member and the first member.

7. An appliance according to claim 6, wherein each of said plurality of second members is operable to generate an electromagnetic signal having a characteristic feature indicative of the second member which generated the signal.

8. An appliance according to claim 7, wherein said plurality of second members are operable to generate electromagnetic signals at respective different frequencies.

9. An appliance according to claim 7, wherein each second member comprises a resonator having a different resonant frequency.

10. An appliance according to claim 1, wherein said first and second members are rotatable relative to each other and wherein said output signal varies in dependence upon the relative orientation of said first and second members.

11. An appliance according to claim 1, wherein said sensing means extends in a measurement direction, wherein said first and second members are moveable in said measurement direction and wherein said output signal varies in dependence upon the relative position of said first and second members in said measurement direction.

12. An appliance according to claim 1, wherein said first and second members are moveable away from and towards each other and wherein said output signal varies in dependence upon the relative separation between said first and second members.

13. An appliance according to claim 12, wherein said means for controlling the appliance includes means for generating a digital signal which may take either one of two possible values in dependence upon whether the relative separation between said first and second members exceeds a predetermined threshold amount.

14. An appliance according to claim 1, further including an interface overlay which is removably attached to a receiving surface of said appliance and is able to receive the or each second member for manipulation by a user to alter its position or orientation relative to the first member.

15. An appliance according to claim 14, wherein the interface overlay includes graphical or textual information which indicates the significance of each position or orientation into which the or each second member may be located relative to the first member.

16. An appliance according to claim 14, wherein the second member is mounted on the interface overlay such that as its position or orientation is adjusted by a user, tactile sensory feedback is provided to the user.

17. An appliance according to claim 14, further comprising one or more additional interface overlays each of which may be mounted instead of or in front of each other interface overlay and wherein the means for controlling the appliance includes means for ascertaining which overlay or overlays is or are removably attached to the receiving surface of said appliance.

18. An appliance according to claim 17, wherein the additional interface overlays are bound together to form a book of interface overlays.

19. An appliance according to claim 14, wherein the or each overlay includes one or more of the or each second members, and wherein the signal generation means of the or each mounted second member is operable to generate a signal which identifies the type of interface overlay on which the or each second member is mounted.

20. An appliance according to claim 1, wherein said second member includes a plurality of signal generators, the relative positions of which are characteristic of the second member.

21. An appliance according to claim 1, wherein the second member includes a plurality of signal generators, each being operable to generate a respective different signal, the respective different signals being characteristic of the second member.

22. An appliance according to claim 1, wherein the means for controlling the appliance includes means for setting a plurality of control settings in accordance with a set of pre-stored values associated with the signal or signals generated by the or each second member.

23. An appliance according to claim 1, wherein the means for controlling the appliance includes means for comparing the signal or signals generated by the or each second member with a pre-stored value to ascertain if a predetermined relationship exists between the signal or signals and the pre-stored value, and means for preventing operation of the appliance if the predetermined relationship is not ascertained.

24. An appliance according to claim 1, wherein the or each second member includes means for modulating a remotely detectable carrier signal in accordance with a pre-stored message, and the means for controlling the appliance means includes means for demodulating the modulated carrier signal to recover the pre-stored message.

25. An appliance according to claim 24, wherein the means for remotely sensing the signal generated by said second member and for outputting a signal which varies in dependence upon the relative position of said first and second members is also operable to remotely sense the modulated carrier signal and to output a signal which is also modulated and from which the pre-stored message in the second member may be recovered.

26. An appliance according to claim 1, wherein the means for controlling the appliance further includes switching means for selectively connecting a processing means for processing the signals output from the first member either to the first member or to a third member which is mounted in or on the domestic appliance and includes means for remotely sensing a signal generated by a fourth member and for outputting a signal which varies in dependence upon the sensed relative position of said third and fourth members.

27. An appliance according to claim 1, further including a third and a fourth member, said fourth member including means for generating a signal, and said third member including means for remotely sensing the signal generated by said fourth member and for outputting a signal which varies in dependence upon the relative position of said third and fourth members, said third and fourth members being sensing means which are relatively mounted in or on the appliance such that the relative position of the third and fourth members is indicative of an operational status characteristic of the appliance.

28. An appliance according to claim 27, wherein the fourth member is mounted on a shaft for rotation therewith and the third member is operable to generate signals which vary in dependence upon the rate at which said shaft rotates.

29. An appliance according to claim 1, wherein the appliance has a number of different modes of operation and wherein the means for controlling the appliance includes means for selecting one of said modes of operation in dependence upon the sensed relative position of the first and second members.

30. An appliance according to claim 1, wherein the second member comprises a printed circuit board on which is mounted said means for remotely sensing the signal generated by said second member and for outputting a signal which varies in dependence upon the sensed relative position of said first and second members.

31. An appliance according to claim 30, wherein the printed circuit board also has additional electric components mounted thereon.

32. An appliance according to claim 31, wherein the printed circuit board has display components mounted thereon.

33. A domestic appliance according to claim 1, wherein one of the first and second members is a key, and wherein said control means is arranged to permit operation of the domestic appliance in accordance with the sensed relative position of said first and second members.

34. A domestic appliance according to claim 1, wherein one of said first and second relatively movable members is a user identification puck, and wherein said control means is arranged to associate the user identification puck with a particular user.

35. A domestic appliance having a man-machine interface for controlling the operation thereof, the man-machine interface comprising:

first and second relatively moveable members;

wherein said second member comprises a signal generator operable to generate a signal; and wherein said first member comprises a sensor operable to sense the signal generated by said second member and to output a signal which varies in dependence upon the relative position of said first and second members;

a controller operable to control the appliance in dependence upon the sensed relative position of said first and second members wherein the first member is located with a housing of the appliance and the second member is provided external to said housing and being movable by a user relative to said housing; and wherein said second member comprises a resonator.

36. A man-machine interface for controlling the operation of an appliance, the man-machine interface comprising first and second relatively moveable members;

wherein said second member comprises means for generating a signal;

wherein said first member comprises mean for sensing the signal generated by said second member and for outputting a signal which varies dependent upon the relative position of said first and second members;

means for controlling the appliance dependent upon the sense relative position of said first and second members; and wherein said second member comprises a resonator.

37. A man-machine interface according to claim 36, wherein said signal generating means is passive and wherein said first member comprises means for energising said signal generating means.

38. A man-machine interface according to claim 36, wherein said resonator comprises an electrically resonant circuit.

39. A man-machine interface according to claim 36, wherein said energising means comprises an excitation coil and means for applying an excitation current to the excitation coil for causing the resonator to resonate; and wherein said sensing means comprises at least one sensor coil for sensing the electromagnetic field generated by said resonator.

40. A man-machine interface according to claim 39, wherein the sensing means comprises at least two sensor coils for sensing the electromagnetic field generated by said resonator, whereby the signal generated by one sensor coil may be compared with the signal generated by the other sensor coil to thereby generate the output signal which varies in dependence upon the relative position of said first and second members.

41. A man-machine interface according to claim 36, comprising a plurality of said second members, each operable to generate a respective signal and wherein said sensing means is provided in common to said plurality of second members and is operable to generate a respective output signal for each second member indicative of the relative position of the respective second member and the first member.

42. A man-machine interface according to claim 41, wherein each of said plurality of second members is operable to generate an electromagnetic signal having a characteristic feature indicative of the second member which generated the signal.

43. A man-machine interface according to claim 42, wherein said plurality of second members are operable to generate electromagnetic signals at respective different frequencies.

44. A man-machine interface according to claim 42, wherein each second member comprises a resonator having a different resonant frequency.

45. A man-machine interface according to claim 36, wherein said first and second members are rotatable relative to each other and wherein said output signal varies in dependence upon the relative orientation of said first and second members.

46. A man-machine interface according to claim 36, wherein said sensing means extends in a measurement direction, wherein said first and second members are moveable in said measurement direction and wherein said output signal varies in dependence upon the relative position of said first and second members in said measurement direction.

47. A man-machine interface according to claim 36, wherein said first and second members are moveable away from and towards each other and wherein said output signal varies in dependence upon the relative separation between said first and second members.

48. A man-machine interface according to claim 47, wherein said means for controlling the appliance includes means for generating a digital signal which may take either one of two possible values in dependence upon whether the relative separation between said first and second members exceeds a predetermined threshold amount.

49. A man-machine interface according to claim 36, wherein said second member includes a plurality of signal generators, the relative positions of which are characteristic of the second member.

50. A man-machine interface according to claim 36, wherein the second member includes a plurality of signal generators, each being operable to generate a respective different signal, the respective different signals being characteristic of the second member.

51. A man-machine interface according to claim 36, wherein the means for controlling the appliance includes means for setting a plurality of control settings in accordance with a set of pre-stored values associated with the signal or signals generated by the or each second member.

52. A man-machine interface according to claim 36, wherein the means for controlling the appliance includes means for comparing the signal or signals generated by the or each second member with a pre-stored value to ascertain if a predetermined relationship exists between the signal or signals and the pre-stored value, and means for preventing operation of the appliance if the predetermined relationship is not ascertained.

53. A man-machine interface according to claim 36, wherein the or each second member includes means for modulating a remotely detectable carrier signal in accordance with a pre-stored message, and the means for controlling the appliance means includes means for demodulating the modulated carrier signal to recover the pre-stored message.

54. A man-machine interface according to claim 53 wherein the means for remotely sensing the signal generated by said second member and for outputting a signal which varies in dependence upon the relative position of said first and second members is also operable to remotely sense the modulated carrier signal and to output a signal which is also modulated and from which the pre-stored message in the second member may be recovered.

55. A man-machine interface according to claim 36, wherein the means for controlling the appliance further includes switching means for selectively connecting a processing means for processing the signals output from the first member either to the first member or to a third member which is mounted in or on the domestic appliance and includes means for remotely sensing a signal generated by a fourth member and for outputting a signal which varies in dependence upon the sensed relative position of said third and fourth members.

56. A man-machine interface according to claim 36, further including a third and a fourth member, said fourth member including means for generating a signal, and said third member including means for remotely sensing the signal generated by said fourth member and for outputting a signal which varies in dependence upon the relative position of said third and fourth members, said third and fourth members being sensing means which are relatively mounted in or on the appliance such that the relative position of the third and fourth members is indicative of an operational status characteristic of the appliance.

57. A man-machine interface according to claim 56 wherein the fourth member is mounted on a shaft for rotation therewith and the third member is operable to generate signals which vary in dependence upon the rate at which said shaft rotates.

58. A man-machine interface according to claim 36, wherein the second member comprises a printed circuit board on which is mounted said means for remotely sensing the signal generated by said second member and for outputting a signal which varies in dependence upon the sensed relative position of said first and second members.

59. A man-machine interface according to claim 58 wherein the printed circuit board also has additional electric components mounted thereon.

60. A man-machine interface according to claim 59 wherein the printed circuit board has display components mounted thereon.

61. An appliance having a man-machine interface for controlling the operation thereof, the man-machine interface comprising:

a first member located within a housing of the appliance and a second member which is movable relative to the first member by a user, wherein the second member comprises a passive resonator and the first member comprises: i) an energizer operable to energize said resonator, said energizer comprising an excitation winding and a current supplier operable to apply an excitation current to the excitation coil to cause the resonator to resonate; and ii) a sensor operable to sense the signal generated by the resonator and to output a signal which varies dependent upon the relative position of the first and second members, said sensor comprising at least one sensor winding for sensing the electromagnetic field generated by said resonator; and a controller operable to control the appliance dependent upon the sensed relative position of said first and second members.

* * * * *

UNITED STATES PATENT AND TRADEMARK OFFICE

CERTIFICATE OF CORRECTION

PATENT NO. : 7,016,744 B2
APPLICATION NO. : 10/165205
DATED : March 1, 2006
INVENTOR(S) : Howard et al.

It is certified that error appears in the above-identified patent and that said Letters Patent is hereby corrected as shown below:

Title page, item (73) IAssignee: Delete “Scientific Generics Limited, Cambridge (GB)” and insert --Sensopad Limited, Gambridge (GB)--.

Signed and Sealed this

Ninth Day of January, 2007

JON W. DUDAS
*Director of the United States Patent and Trademark Office*

UNITED STATES PATENT AND TRADEMARK OFFICE

CERTIFICATE OF CORRECTION

PATENT NO. : 7,016,744 B2

APPLICATION NO. : 10/165205
DATED : March 21, 2006
INVENTOR(S) : Howard et al.

It is certified that error appears in the above-identified patent and that said Letters Patent is hereby corrected as shown below:

Title page, item (73) IAssignee: Delete “Scientific Generics Limited, Cambridge (GB)” and insert --Sensopad Limited, Gambridge (GB)--.

This certificate supersedes Certificate of Correction issued January 9, 2007.

Signed and Sealed this

Sixth Day of February, 2007

JON W. DUDAS
*Director of the United States Patent and Trademark Office*